(12) United States Patent
Wang et al.

(10) Patent No.: US 12,308,946 B2
(45) Date of Patent: May 20, 2025

(54) METHOD FOR DETERMINING TRANSMISSION MODE AND APPARATUS

(71) Applicant: HUAWEI TECHNOLOGIES CO., LTD., Guangdong (CN)

(72) Inventors: Mingzhe Wang, Shanghai (CN); Hongzhe Shi, Shenzhen (CN); Xiang Ren, Shanghai (CN); Liuliu Ji, Shanghai (CN); Haicun Hang, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/671,575

(22) Filed: Feb. 14, 2022

(65) Prior Publication Data
US 2022/0173866 A1 Jun. 2, 2022

Related U.S. Application Data

(63) Continuation of application No. PCT/CN2019/108810, filed on Sep. 28, 2019.

(30) Foreign Application Priority Data

Aug. 16, 2019 (WO) ................ PCT/CN2019/101072

(51) Int. Cl.
*H04J 13/00* (2011.01)
*H04J 3/02* (2006.01)
*H04L 5/00* (2006.01)

(52) U.S. Cl.
CPC ............ *H04J 13/0077* (2013.01); *H04J 3/02* (2013.01); *H04L 5/0051* (2013.01); *H04J 2013/0088* (2013.01)

(58) Field of Classification Search
CPC ....... H04L 5/0051; H04J 3/02; H04J 13/0077; H04J 2013/0088
See application file for complete search history.

(56) References Cited

U.S. PATENT DOCUMENTS

| 2005/0111397 A1 | 5/2005 | Attar et al. |
| 2015/0249511 A1 | 9/2015 | Chen et al. |

(Continued)

FOREIGN PATENT DOCUMENTS

| CN | 1902975 A | 1/2007 |
| CN | 101141756 A | 3/2008 |

(Continued)

OTHER PUBLICATIONS

Qualcomm Incorporated, "Multi-TRP Enhancements", 3GPP TG RAN WG1 Meeting #97, May 13-17, 2019, Reno, Nevada, USA, R1-1907289 (Year: 2019).*

Vivo, Discussion on Multi-TRP based URLLC transmission. 3GPP TSG RAN WG1 #96bis, Xi an, China, Apr. 8-12, 2019, R1-1904101, 3 pages.

(Continued)

*Primary Examiner* — Joseph A Bednash

(57) ABSTRACT

A method and apparatus are provided for determining a transmission mode. A method embodiment includes obtaining, by a terminal device, configuration indication information, the configuration indication information comprising one or more of: DMRS indication information, repeated-transmission indication information, or transmission configuration indication information; and determining a transmission mode based on the configuration indication information, the transmission mode is one or more of: a space division multiplexing mode, a frequency division multiplexing mode, or a time division multiplexing mode.

16 Claims, 7 Drawing Sheets

(56) References Cited

U.S. PATENT DOCUMENTS

| | | |
|---|---|---|
| 2019/0103941 A1 | 4/2019 | Seo et al. |
| 2019/0174527 A1 | 6/2019 | Park et al. |
| 2022/0104237 A1* | 3/2022 | Muruganathan ...... H04L 5/0053 |
| 2022/0224472 A1 | 7/2022 | Kim et al. |

FOREIGN PATENT DOCUMENTS

| | | |
|---|---|---|
| CN | 101873670 A | 10/2010 |
| CN | 106470088 A | 3/2017 |
| CN | 107276734 A | 10/2017 |
| CN | 107371256 A | 11/2017 |
| CN | 108631835 A | 10/2018 |
| CN | 109391456 A | 2/2019 |
| RU | 2486706 C2 | 6/2013 |
| WO | 2018138555 A1 | 8/2018 |
| WO | 2020164014 A1 | 8/2020 |
| WO | 2020222601 A1 | 11/2020 |

OTHER PUBLICATIONS

3GPP TS 38.214 V15.6.0 (Jun. 2019), 3rd Generation Partnership Project; Technical Specification Group Radio Access Network;NR;Physical layer procedures for data(Release 15), total 105 pages.

3GPP TS 38.212 V15.6.0 (Jun. 2019), 3rd Generation Partnership Project; Technical Specification Group Radio Access Network; NR; Multiplexing and channel coding(Release 15), 101 pages.

Ericsson, On multi-TRP and multi-panel. 3GPP TSG RAN WG1 Meeting RAN1#96-bis, Xi''an, China, Apr. 8-12, 2019, R1-1904750, 18 pages.

Qualcomm Incorporated, Multi-TRP Enhancements. 3GPP TSG-RAN WGI Meeting #97, May 13-17, 2019, Reno, Nevada, USA, R1-1907289, 25 pages.

KDDI, Enhancements on Multi-TRP/panel transmission. 3GPP TSG RAN WG1 Meeting #97, Reno, USA, May 13-17, 2019, R1-1907417, 6 pages.

Huawei , HiSilicon .R1-1903983 "Reliability/robustness enhancement withmulti-TRP/panel".Xi'an, China Apr. 8-12, 2019,total 10 pages.

ZTE.R1-1904013 "Enhancements onMulti-TRP and Multi-panel Transmission",Xi an, China, Apr. 8-12, 2019, total 13 pages.

* cited by examiner

METHOD FOR DETERMINING TRANSMISSION MODE AND APPARATUS

CROSS-REFERENCE TO RELATED APPLICATIONS

This application is a continuation of International Application No. PCT/CN2019/108810, filed on Sep. 28, 2019, which claims priority to International Patent Application No. PCT/CN2019/101072, filed on Aug. 16, 2019. The disclosures of the aforementioned applications are hereby incorporated by reference in their entireties.

TECHNICAL FIELD

Embodiments of this application relate to the field of communications technologies, and specifically, to a method for determining a transmission mode and an apparatus.

BACKGROUND

With development of communications technologies, fifth-generation communications systems (or referred to as new radio (NR)) emerge. The 5G system includes three application scenarios: enhanced mobile broadband (eMBB), ultra-reliable and low-latency communication (uRLLC), and massive machine type communication (mMTC)

Currently, in a uRLLC scenario, repeated transmission is used to improve transmission robustness. The repeated transmission may be one or more of repeated transmission in space domain, repeated transmission in frequency domain, or repeated transmission in time domain. The repeated transmission in space domain is spatial domain multiplexing (SDM), and corresponds to one transmission mode. The repeated transmission in frequency domain is frequency domain multiplexing (FDM), and corresponds to two transmission modes. The repeated transmission in time domain is time domain multiplexing (TDM), and corresponds to two transmission modes. For a plurality of transmission modes in the eMBB scenario and the uRLLC scenario, how a terminal identifies a transmission mode used on a network side is a technical problem that urgently needs to be resolved.

SUMMARY

Embodiments of this application provide a method for determining a transmission mode and an apparatus, to identify a transmission mode used on a network side, so that a terminal side performs receiving and processing based on the transmission mode.

A first aspect of the embodiments of this application provides a method for determining a transmission mode. The method includes:

obtaining configuration indication information, where the configuration indication information is one or more of demodulation reference signal (DMRS) indication information, repeated-transmission indication information, or transmission configuration indication information; and determining a transmission mode based on the configuration indication information, where the transmission mode is one or more of a space division multiplexing mode, a frequency division multiplexing mode, or a time division multiplexing mode.

The method provided in the first aspect of the embodiments of this application may be performed by a terminal device, or may be performed by a component (for example, a processor, a chip, or a chip system) of a terminal device. The terminal device identifies, based on the configuration indication information, a transmission mode used by a network device, and then may perform corresponding receiving processing based on the transmission mode.

The DMRS indication information may be used to indicate one or more DMRS port identifiers, or may be used to indicate one or more DMRS port identifiers and a quantity of code division multiplexing (CDM) groups without data.

The DMRS indication information in the embodiments of this application may also be described as antenna port indication information. A relationship between an index of a DMRS port and an index of an antenna port is: the index of the DMRS port+1000=the index of the antenna port.

The repeated-transmission indication information is used to indicate a time domain repeated-transmission parameter, or is used to indicate a first time domain repeated-transmission parameter and a second time domain repeated-transmission parameter, or is used to indicate a time domain repeated-transmission parameter and a frequency domain repeated-transmission parameter, or is used to indicate a frequency domain repeated-transmission parameter, a first time domain repeated-transmission parameter, and a second time domain repeated-transmission parameter.

The transmission configuration indication (TCI) information is used to indicate a TCI state in a transmission process. The TCI information may be a TCI codepoint. In a case of multi-station transmission, one TCI codepoint may indicate two or more TCI states. In an embodiment, the configuration indication information is the repeated-transmission indication information, and the repeated-transmission indication information is used to indicate a time domain repeated-transmission parameter. When the terminal device has obtained the configuration indication information, that is, has obtained the time domain repeated-transmission parameter, the terminal device determines, based on the time domain repeated-transmission parameter, that the transmission mode is the time division multiplexing mode. In this manner, it is identified, by using the obtained time domain repeated-transmission parameter, that the transmission mode is the time division multiplexing mode. On the contrary, when the terminal device has not obtained the configuration indication information, that is, has not obtained the time domain repeated-transmission parameter, the terminal device determines that the transmission mode cannot be the time division multiplexing mode, in other words, the transmission mode may be any one of the frequency division multiplexing mode, the space division multiplexing mode, or an integrated mode of the frequency division multiplexing mode and the space division multiplexing mode.

In an embodiment, after the transmission mode is identified as the time division multiplexing mode by using the time domain repeated-transmission parameter, it may be further identified whether the time division multiplexing mode is a first time division multiplexing mode or a second time division multiplexing mode. The first time division multiplexing mode is a time division multiplexing mode within a slot unit, and the second time division multiplexing mode is a time division multiplexing mode between slot units.

If the time domain repeated-transmission parameter is the first time domain repeated-transmission parameter, it may be determined that the time division multiplexing mode is the first time division multiplexing mode; or if the time domain repeated-transmission parameter is the second time domain repeated-transmission parameter, it may be determined that the time division multiplexing mode is the second time division multiplexing mode.

If the time domain repeated-transmission parameter includes a particular parameter of the first time division multiplexing mode, it may be determined that the time division multiplexing mode is the first time division multiplexing mode. For example, if the time domain repeated-transmission parameter includes offset information, it may be determined that the time division multiplexing mode is the first time division multiplexing mode; or if the time domain repeated-transmission parameter does not include offset information, it may be determined that the time division multiplexing mode is the second time division multiplexing mode. The offset information may represent offset information of time domain positions of a plurality of physical downlink shared channels (PDSCH).

In an embodiment, the configuration indication information is the repeated-transmission indication information, and the repeated-transmission indication information is used to indicate the first time domain repeated-transmission parameter and the second time domain repeated-transmission parameter. When the terminal device has obtained the configuration indication information, that is, has obtained the first time domain repeated-transmission parameter and the second time domain repeated-transmission parameter, the terminal device determines, based on values of the first time domain repeated-transmission parameter and the second time domain repeated-transmission parameter, whether the transmission mode is the time division multiplexing mode. When the terminal device has not obtained the configuration information, that is, has not obtained the first time domain repeated-transmission parameter and the second time domain repeated-transmission parameter, the terminal device determines that the transmission mode is the frequency division multiplexing mode, the space division multiplexing mode, or the integrated mode of the frequency division multiplexing mode and the space division multiplexing mode.

The determining, based on values of the first time domain repeated-transmission parameter and the second time domain repeated-transmission parameter, whether the transmission mode is the time division multiplexing mode may include: if values of both the first time domain repeated-transmission parameter and the second time domain repeated-transmission parameter are a first preset value, determining that the transmission mode is the frequency division multiplexing mode, the space division multiplexing mode, or the integrated mode of the frequency division multiplexing mode and the space division multiplexing mode; or if either or both values of the first time domain repeated-transmission parameter and the second time domain repeated-transmission parameter are greater than a first preset value, determining that the transmission mode is the time division multiplexing mode. The first preset value may be "1".

In an embodiment, after the transmission mode is identified as the time division multiplexing mode by using the first time domain repeated-transmission parameter and the second time domain repeated-transmission parameter, it may be further identified whether the transmission mode is a first time division multiplexing mode or a second time division multiplexing mode. The first time division multiplexing mode is a time division multiplexing mode within a slot unit, and the second time division multiplexing mode is a time division multiplexing mode between slot units.

If a value of the first time domain repeated-transmission parameter is a first preset value and a value of the second time domain repeated-transmission parameter is greater than the first preset value, it is determined that the time division multiplexing mode is the second time division multiplexing mode; or if a value of the second time domain repeated-transmission parameter is a first preset value and a value of the first time domain repeated-transmission parameter is greater than the first preset value, it is determined that the time division multiplexing mode is the first time division multiplexing mode; or if values of both the first time domain repeated-transmission parameter and the second time domain repeated-transmission parameter are greater than a first preset value, it is determined that the time division multiplexing mode is an integrated mode of the first time division multiplexing mode and the second time division multiplexing mode.

When the time division multiplexing mode is identified, the space division multiplexing mode and the frequency division multiplexing mode may be identified based on that the configuration indication information is the DMRS indication information.

In an embodiment, one or more DMRS port identifiers are determined based on the DMRS indication information, and the transmission mode is determined based on the one or more DMRS port identifiers.

Manner 1: If a quantity of CDM groups corresponding to the one or more DMRS port identifiers is a second preset value, it is determined that the transmission mode is the frequency division multiplexing mode; or if a quantity of CDM groups corresponding to the one or more DMRS port identifiers is a third preset value, it is determined that the transmission mode is the space division multiplexing mode. The second preset value may be 1, representing one CDM group.

Manner 2: If the one or more DMRS port identifiers belong to a same CDM group, it is determined that the transmission mode is the frequency division multiplexing mode; or if the one or more DMRS port identifiers do not belong to a same CDM group, it is determined that the transmission mode is the space division multiplexing mode.

Manner 3: If a quantity of the one or more DMRS port identifiers is a second preset value, it is determined that the transmission mode is the frequency division multiplexing mode; or if a quantity of the one or more DMRS port identifiers is not a second preset value, it is determined that the transmission mode is the space division multiplexing mode. The second preset value may be 1, representing one CDM group. The third preset value may be 2, representing two CDM groups.

Manner 4: If the one or more DMRS port identifiers are preset identifiers, it is determined that the transmission mode is the frequency division multiplexing mode; or if the one or more DMRS port identifiers are not preset identifiers, it is determined that the transmission mode is the space division multiplexing mode. The preset identifier may be [0], [1], or [0, 1].

The foregoing four manners of determining the transmission mode based on the one or more DMRS port identifiers are used as examples, and do not constitute a limitation on the embodiments of this application.

In an embodiment, a quantity of CDM groups is determined based on the DMRS indication information, and the transmission mode is determined based on the quantity of CDM groups. If the quantity of CDM groups is a second preset value, it is determined that the transmission mode is the frequency division multiplexing mode; or if the quantity of CDM groups is a third preset value, it is determined that the transmission mode is the space division multiplexing mode.

In an embodiment, after it is determined that the transmission mode is the frequency division multiplexing mode, it may be further identified whether the frequency division multiplexing mode is a first frequency division multiplexing mode or a second frequency division multiplexing mode. The first frequency division multiplexing mode is a single-codeword-based frequency division multiplexing mode, and the second frequency division multiplexing mode is a multi-codeword-based frequency division multiplexing mode.

If a frequency domain repeated-transmission parameter has been obtained, it is determined that the frequency division multiplexing mode is a second frequency division multiplexing mode; or if a frequency domain repeated-transmission parameter has not been obtained, it is determined that the frequency division multiplexing mode is a first frequency division multiplexing mode.

In an embodiment, the configuration indication information is the repeated-transmission indication information, and the repeated-transmission indication information is used to indicate a time domain repeated-transmission parameter. It is determined, based on the time domain repeated-transmission parameter, that the transmission mode is a second time division multiplexing mode, where the second time division multiplexing mode is a time division multiplexing mode between slot units.

In an embodiment, after the transmission mode is identified as the second time division multiplexing mode, several remaining transmission modes may be identified based on that the configuration indication information is the DMRS indication information. DMRS port information is determined based on the DMRS indication information, and the several remaining transmission modes is determined based on the DMRS port information.

In an embodiment, the DMRS port information includes one or more DMRS port identifiers and a quantity of CDM groups without data, and it is determined, based on the quantity of CDM groups corresponding to the one or more DMRS port identifiers and the quantity of CDM groups without data, that the transmission mode is the space division multiplexing mode, the frequency division multiplexing mode, or the first time division multiplexing mode. If it is determined that the transmission mode is the frequency division multiplexing mode, it is determined, based on a group identifier of a CDM group corresponding to the one or more DMRS port identifiers, that the transmission mode is a first frequency division multiplexing mode or a second frequency division multiplexing mode. The first time division multiplexing mode is a time division multiplexing mode within a slot unit, the first frequency division multiplexing mode is a single-codeword-based frequency division multiplexing mode, and the second frequency division multiplexing mode is a multi-codeword-based frequency division multiplexing mode.

For example, if a quantity of CDM groups corresponding to the one or more DMRS port identifiers is a third preset value, it is determined that the transmission mode is the space division multiplexing mode; if a quantity of CDM groups corresponding to the one or more DMRS port identifiers is a second preset value and a quantity of CDM groups without data is the second preset value, it is determined that the transmission mode is the first time division multiplexing mode, where the first time division multiplexing mode is a time division multiplexing mode within a slot unit; or if a quantity of CDM groups corresponding to the one or more DMRS port identifiers is a second preset value and a quantity of CDM groups is a third preset value, it is determined that the transmission mode is the frequency division multiplexing mode. After it is determined that the transmission mode is the frequency division multiplexing mode, if a group identifier of a CDM group corresponding to the one or more DMRS port identifiers is a first identifier, it is determined that the transmission mode is the first frequency division multiplexing mode; or if a group identifier of a CDM group corresponding to the one or more DMRS port identifiers is a second identifier, it is determined that the transmission mode is the second frequency division multiplexing mode.

In an embodiment, the configuration indication information is the DMRS indication information and the repeated-transmission indication information, and the repeated-transmission indication information is used to indicate a frequency domain repeated-transmission parameter, a first time domain repeated-transmission parameter, and a second time domain repeated-transmission parameter. The repeated-transmission indication information may be represented by {a, b, c}. For example, a represents the frequency domain repeated-transmission parameter, b represents the first time domain repeated-transmission parameter, and c represents the second time domain repeated-transmission parameter.

A quantity of CDM groups is determined based on the DMRS indication information, and the transmission mode is determined based on the quantity of CDM groups, the frequency domain repeated-transmission parameter, the first time domain repeated-transmission parameter, and the second time domain repeated-transmission parameter. For example, if it is determined, based on the DMRS indication information, that the quantity of CDM groups is two and the repeated-transmission indication information is {1, 1, 1}, it may be determined that the transmission mode is the space division multiplexing mode.

In an embodiment, the configuration indication information is the DMRS indication information, and the DMRS indication information is used to indicate one or more of one or more DMRS port identifiers, a group identifier of a CDM group, a quantity of CDM groups, a group identifier of a CDM group without data, or a quantity of CDM groups without data.

The determining a transmission mode based on the configuration indication information includes: determining, based on the DMRS indication information, that the transmission mode is one or more of the space division multiplexing mode, a first frequency division multiplexing mode, a second frequency division multiplexing mode, a first time division multiplexing mode, or a second time division multiplexing mode.

The DMRS indication information is used to indicate one or more DMRS port identifiers, and different DMRS port identifiers correspond to different transmission modes or correspond to different sub-modes of a same transmission mode.

The DMRS indication information is used to indicate one or more DMRS port identifiers, the one or more DMRS port identifiers belong to different CDM groups, and identifiers of the different CDM groups correspond to different transmission modes or correspond to different sub-modes of a same transmission mode.

The DMRS indication information is used to indicate one or more DMRS port identifiers, the one or more DMRS port identifiers belong to different CDM groups, and different quantities of CDM groups correspond to different transmission modes or correspond to different sub-modes of a same transmission mode.

The DMRS indication information is used to indicate a group identifier of a CDM group or a quantity of CDM groups; and different group identifiers of CDM groups correspond to different transmission modes or correspond to different sub-modes of a same transmission mode; or different quantities of CDM groups correspond to different transmission modes or correspond to different sub-modes of a same transmission mode.

The DMRS indication information is used to indicate a group identifier of a CDM group without data or a quantity of CDM groups without data; and different quantities of CDM groups without data correspond to different transmission modes or correspond to different sub-modes of a same transmission mode; or different identifiers of CDM groups without data correspond to different transmission modes or correspond to different sub-modes of a same transmission mode.

The DMRS indication information is used to indicate one or more DMRS port identifiers and an identifier of a CDM group without data or a quantity of CDM groups without data; and different combinations of the CDM group identifier and the quantity of CDM groups without data correspond to different transmission modes or correspond to different sub-modes of a same transmission mode; or different combinations of the CDM group identifier and the group identifier of the CDM group without data correspond to different transmission modes or correspond to different sub-modes of a same transmission mode.

The DMRS indication information is used to indicate a quantity of CDM groups and a group identifier of a CDM group without data or a quantity of CDM groups without data; and different combinations of the quantity of CDM groups and the quantity of CDM groups without data correspond to different transmission modes or correspond to different sub-modes of a same transmission mode; or different combinations of the group identifier of the CDM group and the quantity of CDM groups without data correspond to different transmission modes or correspond to different sub-modes of a same transmission mode.

The DMRS indication information is used to indicate a group identifier of a CDM group and a group identifier of a CDM group without data or a quantity of CDM groups without data; and different combinations of the group identifier of the CDM group and the group identifier of the CDM group without data correspond to different transmission modes or correspond to different sub-modes of a same transmission mode; or different combinations of the group identifier of the CDM group and the quantity of CDM groups without data correspond to different transmission modes or correspond to different sub-modes of a same transmission mode.

The DMRS indication information includes a used value and a predefined value, and the used value is used to indicate one or more of one or more DMRS port identifiers, a group identifier of a CDM group, a quantity of CDM groups, an identifier of a CDM group without data, or a quantity of CDM groups without data; and different used values correspond to different transmission modes or correspond to different sub-modes of a same transmission mode; or different predefined values correspond to different transmission modes or correspond to different sub-modes of a same transmission mode; or different combinations of the used value and the predefined value correspond to different transmission modes or correspond to different sub-modes of a same transmission mode.

In an embodiment, the configuration indication information is TCI information, and the TCI information is used to indicate a TCI state. If a quantity of TCI states is a fourth preset value, it may be determined that the transmission mode is the frequency division multiplexing mode or the space division multiplexing mode; or if a quantity of TCI states is greater than a fourth preset value, it may be determined that the transmission mode is the time division multiplexing mode. The fourth preset value may be 2, representing two TCI states.

In an embodiment, the configuration indication information is TCI information and repeated-transmission indication information. The TCI information is used to indicate a TCI state. The repeated-transmission indication information is used to indicate a time domain repeated-transmission parameter. It is determined, based on a quantity of TCI states and the time domain repeated-transmission parameter, that the transmission mode is the time division multiplexing mode.

A second aspect of the embodiments of this application provides a method for determining a transmission mode. The method includes:

if configuration information has been obtained, obtaining transmission mode indication information, where the transmission mode indication information is used to indicate a transmission mode; and determining the transmission mode based on the transmission mode indication information.

The method provided in the second aspect of the embodiments of this application may be performed by a terminal device, or may be performed by a component (for example, a processor, a chip, or a chip system) of a terminal device. Dynamic switching between a multi-station uRLLC scenario and a multi-station eMBB scenario may be implemented by using the configuration information and the transmission mode indication information, and no additional indication overheads are required.

The configuration information may be understood as configuration information indicating a uRLLC scenario, to distinguish between the multi-station uRLLC scenario and the multi-station eMBB scenario.

In an embodiment, the configuration information may be used to indicate an exclusive feature of the multi-station uRLLC scenario, for example, used to indicate that the terminal device can use a bit rate lower than a preset bit rate, or used to indicate that the terminal device uses a preset modulation and coding scheme table. The preset bit rate may be 120*1024 (Kbps), the preset modulation and coding scheme table may be a modulation and coding scheme table 3, and a bit rate lower than 120*1024 (Kbps) exists only in Table 3. In this manner, the configuration information may be a newly defined radio network temporary identity (RNTI) or a field in newly defined downlink control information (DCI). If the terminal device has detected the configuration information, the terminal device may consider that a current transmission scenario is a multi-station uRLLC scenario; or if the terminal device has not detected the configuration information, the terminal device may consider that a current transmission scenario is a multi-station eMBB scenario.

In an embodiment, configuration information related to an existing multi-station uRLLC scenario, for example, a modulation and coding scheme cell radio network temporary identity (MCS-C-TNTI), may be reused as the configuration information. If the terminal device has detected the MCS-C-RNTI, the terminal device may consider that a current transmission scenario is a multi-station uRLLC scenario; or if the terminal device has not detected the MCS-C-RNTI, the terminal device may consider that a current transmission scenario is a multi-station eMBB scenario.

In an embodiment, the configuration information may be used to directly indicate that a current transmission scenario is a multi-station uRLLC scenario. If the terminal device has detected the configuration information, the terminal device may consider that the current transmission scenario is a multi-station uRLLC scenario; or if the terminal device has not detected the configuration information, the terminal device may consider that the current transmission scenario is a multi-station eMBB scenario. In this manner, the configuration information may be a newly defined RNTI or a field in newly defined DCI.

In an embodiment, the configuration information may be understood as configuration information indicating an eMBB scenario, for example, indicating an exclusive feature of a multi-station eMBB scenario, or indicating that configuration information related to an existing multi-station eMBB scenario is reused, or indicating that the configuration information may be directly used to indicate that a current transmission scenario is a multi-station eMBB scenario.

The transmission mode indication information may be carried in downlink control information radio resource control signaling. The transmission mode is one or more of a space division multiplexing mode, a first frequency division multiplexing mode, a second frequency division multiplexing mode, a first time division multiplexing mode, or a second time division multiplexing mode. The first frequency division multiplexing mode is a single-codeword-based frequency division multiplexing mode, the second frequency division multiplexing mode is a multi-codeword-based frequency division multiplexing mode, the first time division multiplexing mode is a time division multiplexing mode within a slot unit, and the second time division multiplexing mode is a time division multiplexing mode between slot units.

A third aspect of the embodiments of this application provides a communications apparatus. The communications apparatus may be a terminal device, an apparatus in a terminal device, or an apparatus that can be used together with a terminal device. The communications apparatus has some or all functions of the terminal device in the method example in the first aspect or the second aspect. For example, the terminal device may have functions of implementing some or all of the embodiments of this application, or may have functions of separately implementing any embodiment of this application. The functions may be implemented by hardware, or may be implemented by hardware executing corresponding software. The hardware or software includes one or more units or modules corresponding to the foregoing functions.

In an embodiment, a structure of the terminal device may include a processing unit and a transceiver unit. The processing unit is configured to support the terminal device in executing corresponding functions in the foregoing method. The transceiver unit is configured to support the terminal device in communicating with another device. The terminal device may further include a storage unit. The storage unit is configured to couple to the processing unit and the transceiver unit, and stores a program instruction and data that are necessary for the terminal device.

In an embodiment, the terminal device includes a processing unit and a transceiver unit.

The transceiver unit is configured to obtain configuration indication information, where the configuration indication information is one or more of DMRS indication information, repeated-transmission indication information, or transmission configuration indication information.

The processing unit is configured to determine a transmission mode based on the configuration indication information, where the transmission mode is one or more of a space division multiplexing mode, a frequency division multiplexing mode, or a time division multiplexing mode.

In an example, the processing unit may be a processor, the communications unit may be a transceiver, and the storage unit may be a memory.

In an implementation, the terminal device includes a processor and a transceiver.

The transceiver is configured to obtain configuration indication information, where the configuration indication information is one or more of DMRS indication information, repeated-transmission indication information, or transmission configuration indication information.

The processor is configured to determine a transmission mode based on the configuration indication information, where the transmission mode is one or more of a space division multiplexing mode, a frequency division multiplexing mode, or a time division multiplexing mode.

In an embodiment, the processor may be configured to perform, for example, but not limited to, baseband related processing; and the transceiver may be configured to perform, for example, but not limited to, radio frequency receiving and sending. The foregoing components may be separately disposed on chips independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more components can be integrated into a same chip. For example, the digital baseband processor and a plurality of application processors (for example, but not limited to, a graphics processor and a multimedia processor) may be integrated into a same chip. Such a chip may be referred to as a system on chip. Whether the components are independently disposed on different chips or are integrated and disposed on one or more chips usually depends on specific requirements of a product design. Implementation forms of the components are not limited in the embodiments of the present disclosure.

A fourth aspect of the embodiments of this application provides a processor, configured to perform the foregoing methods. In a process of performing these methods, a process of sending the foregoing information or data and a process of receiving the foregoing information or data in the foregoing methods may be understood as a process of outputting the foregoing information or data by the processor and a process of receiving the foregoing input information or data by the processor. When outputting the information or data, the processor outputs the information or data to a transceiver, so that the transceiver transmits the information or data. Still further, after the information or data is output by the processor, other processing may further need to be performed on the information or data before the information or data arrives at the transceiver. Similarly, when the processor receives the input information or data, the transceiver receives the information or data and inputs the information or data into the processor. Still further, after the transceiver receives the information or data, other processing may need to be performed on the information or data before the information or data is input into the processor.

Based on the foregoing principle, for example, the obtaining configuration information mentioned in the foregoing method may be understood as that the transceiver inputs received configuration information into the processor.

In this case, for operations such as transmission, sending, and receiving related to the processor, if there is no particular statement, or if the operations do not contradict an actual function or internal logic of the operations in related descriptions, the operations may be more generally understood as operations such as input, receiving, and output of the processor, instead of operations such as transmission, sending, and receiving directly performed by a radio frequency circuit and an antenna.

In an embodiment, the processor may be a processor specially configured to perform these methods, or a processor, for example, a general purpose processor, configured to execute a computer instruction in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in the embodiments of the present disclosure.

A fifth aspect of the embodiments of this application provides a chip system. The chip system includes at least one processor and an interface, and is configured to support a terminal device in implementing the functions in the first aspect or the second aspect, for example, determining a transmission mode based on configuration indication information.

In an embodiment, the chip system further includes a memory. The memory is configured to store a program instruction and data that are necessary for the terminal device. The chip system may include a chip, or may include a chip and another discrete component.

A sixth aspect of the embodiments of this application provides a computer storage medium, configured to store a computer software instruction used by the foregoing terminal device. The computer software instruction includes a program configured to perform the method according to the first aspect or the second aspect.

A seventh aspect of the embodiments of this application provides a computer program product including an instruction. When the computer program product runs on a computer, the computer is enabled to perform the method according to the first aspect or the second aspect.

An eighth aspect of the embodiments of this application provides a computer program including an instruction. When the computer program is run on a computer, the computer is enabled to perform the method according to the first aspect or the second aspect.

DESCRIPTION OF EMBODIMENTS

The following describes technical solutions in embodiments of this application with reference to the accompanying drawings in the embodiments of this application. Unless otherwise specified, "I" in descriptions of the embodiments of this application represents an "or" relationship between associated objects. For example, A/B may represent A or B. In description of this application, the term "a plurality of" means two or more than two unless otherwise specified. "At least one item of the following" or a similar expression thereof refers to any combination of these items, including any combination of singular items or plural items. For example, at least one item of a, b, or c may represent: a, b, c, a-b, a-c, b-c, or a-b-c, where a, b, and c may be singular or plural. In addition, to clearly describe the technical solutions in the embodiments of this application, terms such as "first" and "second" are used in the embodiments of this application to distinguish between technical features that have basically same or similar functions and purposes. A person skilled in the art may understand that the terms such as "first" and "second" do not limit a quantity or an execution sequence, and that the terms such as "first" and "second" do not indicate a definite difference.

The embodiments of this application may be applied to a long term evolution (LTE) system and an NR system, and may further be applied to a future communications system, for example, a future network or a sixth generation communications system. The embodiments of this application may be applied to a device to device (D2D) system, a machine to machine (M2M) system, a vehicle to everything (V2X) system, and the like.

Communication manners in the V2X system are collectively referred to as V2X communication. The V2X communication is intended for high-speed devices such as vehicles, and is a basic and key technology applied to a scenario with a very high requirement for communication latency in the future. For example, the scenario may be an intelligent vehicle, self-driving, or an intelligent transportation system. For example, the V2X communication includes vehicle to vehicle (V2V) communication, vehicle to infrastructure (V2I) communication, vehicle to pedestrian (V2P) communication, vehicle to network (V2N) communication, or the like. Communication performed between terminal devices in the V2X system is widely referred to as sidelink (SL) communication. In other words, the terminal in this application may alternatively be a vehicle or a vehicle component applied to a vehicle.

Figure 1:
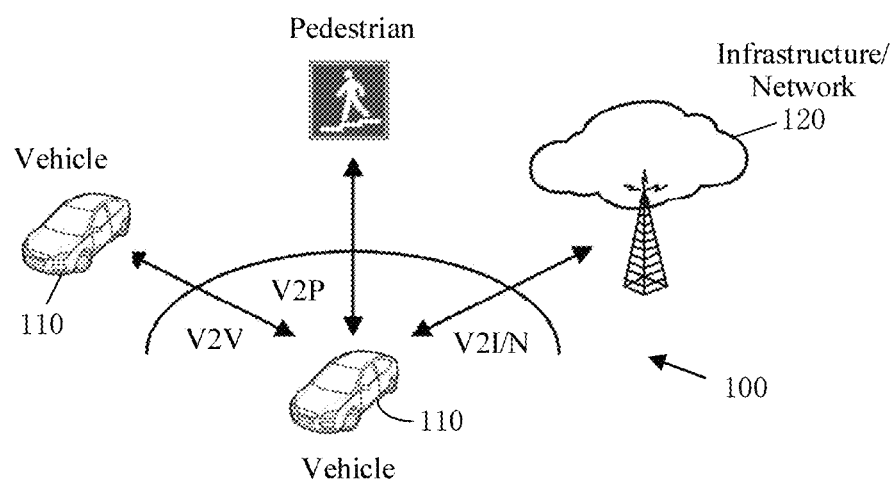
FIG. 1 is a diagram of a network architecture according to an embodiment of this application.

FIG. 1 is a diagram of a V2X system 100 according to an embodiment of this application. The diagram illustrates V2V communication, V2P communication, and V2I/N communication.

As shown in FIG. 1, vehicles or vehicle components 110 communicate with each other by using a V2V system. A vehicle or vehicle component 110 may broadcast information such as a vehicle speed, a driving direction, a location, and whether an emergency brake is stepped on to a surrounding vehicle. A driver of the surrounding vehicle can better learn of a traffic status outside a line of sight by obtaining the information, and therefore, can predict and avoid a risk status in advance. The vehicle or vehicle component 110 communicates with a road side network infrastructure 120 by using a V2I system, and the road side network infrastructure 120 can provide various service information and data network access for the vehicle or vehicle component 110. Functions such as toll collection without stopping and in-vehicle entertainment greatly improve smart transportation. The road side network infrastructure 120 such as a road side unit (RSU) includes two types: an RSU of a terminal device type and an RSU of a network type. Because RSUs are distributed on a road side, and the RSU of the terminal device type is in a non-moving state, mobility does not need to be considered. The RSU of the network device type may provide timing synchronization and resource scheduling for a vehicle or a vehicle component 110 that communicates with a network device. A vehicle or vehicle component 110 communicates with people by using a V2P system. A vehicle or a vehicle component 110 communicates with a network by using a V2N system. A network architecture and a service scenario that are described in the embodiments disclosed in this application are intended to more clearly describe the technical solutions in the embodiments disclosed in this application, and do not constitute a limitation on the technical solutions provided in the embodiments disclosed in this application. A person of ordinary skill in the art may know that with evolution of the network architecture and emergence of new service scenarios, the technical solutions provided in the embodiments disclosed in this application are also applicable to similar technical problems.

Figure 2:
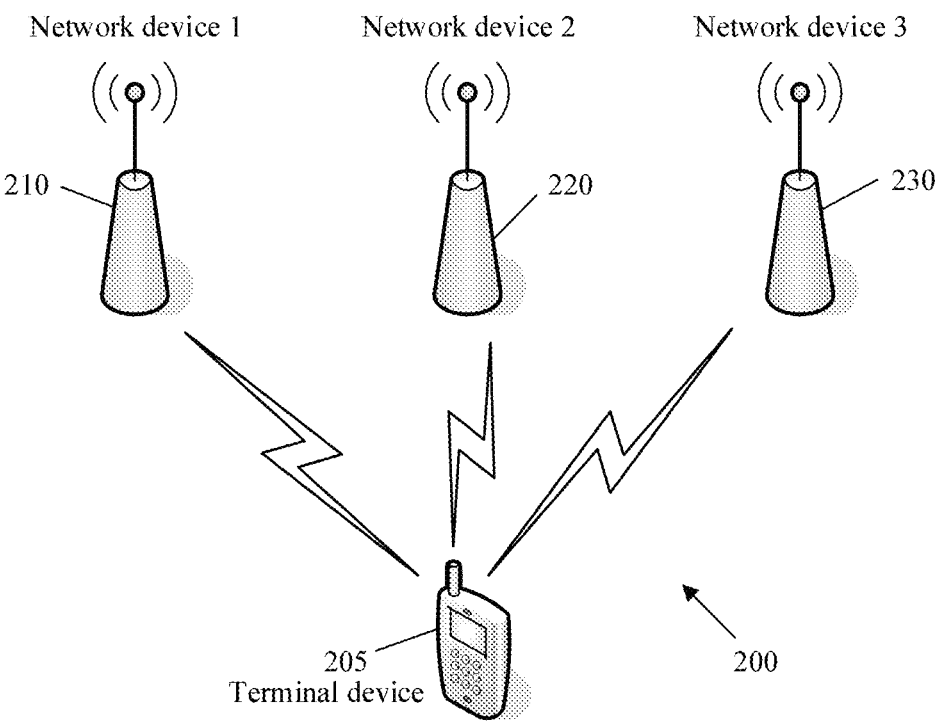
FIG. 2 is a diagram of another network architecture according to an embodiment.

FIG. 2 is a diagram of a network architecture 200 according to an embodiment of this application. The network architecture may include three network devices 210, 220, and 230 and one terminal device 205. A quantity of devices and forms of the devices, as shown in FIG. 2, are used merely as examples and do not constitute a limitation on the embodiments of this application. During actual application, one, two, or more network devices and two or more terminal devices may be included. The network devices 210, 220, and 230 may be configured to communicate with the terminal device 205 through a wireless interface under control of a network device controller (not shown). In some embodiments, the network device controller may be a part of a core network, or may be integrated into the network device. The network devices 210, 220, and 230 may be configured to transmit control information or user data to the core network through a backhaul interface. The network devices 210, 220, and 230 may also directly or indirectly communicate with each other through a backhaul interface.

In this embodiment of this application, the network device 210, 220, and 230 may be any device having a wireless transceiver function, including but not limited to a base station in an LTE system, a gNodeB (gNodeB or gNB) in an NR system, a transmission reception point (TRP) in an NR system, a base station subsequently evolved in 3GPP, an access node in a Wi-Fi system, a wireless relay node, a wireless backhaul node, or the like. The base station may be a macro base station, a micro base station, a picocell base station, a small cell, a relay station, a balloon station, or the like. A plurality of base stations may support the aforementioned networks of a same technology, or may support the aforementioned networks of different technologies. The base station may include one or more co-site or non-co-site TRPs. In an implementation, the TRP may be a network device such as a base station, or may be an antenna panel, a panel, or the like of a base station. The network devices 210, 220, and 230 may alternatively be a radio controller, a centralized unit (CU), and/or a distributed unit (DU) in a cloud radio access network (CRAN) scenario. The network device may alternatively be a server, a wearable device, a vehicle-mounted device, or the like. An example in which the network device is a base station is used for description below. The plurality of network devices 210, 220, and 230 may be base stations of a same type or base stations of different types. The base station may communicate with a terminal device, or may communicate with a terminal device via a relay station.

The terminal device 205 is a device having wireless receiving and sending functions, and may be deployed on land, where the deployment includes indoor or outdoor, handheld, wearable, or vehicle-mounted deployment; may be deployed on water (for example, on a ship); or may be deployed in air (for example, on an aerocraft, a balloon, and a satellite). The terminal device may be a mobile phone, a tablet computer (Pad), a computer with wireless receiving and sending functions, a virtual reality (VR) terminal device, an augmented reality (AR) terminal device, a wireless terminal in industrial control, a vehicle-mounted terminal device, a wireless terminal in self driving, a wireless terminal in telemedicine, a wireless terminal in a smart grid, a wireless terminal in transportation safety, a wireless terminal in a smart city, a wireless terminal in a smart home, a wearable terminal device, or the like. An application scenario is not limited in the embodiments of this application. The terminal device 205 may also be referred to as a terminal, user equipment (UE), an access terminal device, a vehicle-mounted terminal, an industrial control terminal, a UE unit, a UE station, a mobile station, a mobile console, a remote station, a remote terminal device, a mobile device, a UE agent, a UE apparatus, or the like. The terminal device 205 may be fixed or movable.

To improve reliability, a common method is to use a channel diversity gain. The diversity gain includes diversity of a channel in at least one dimension such as a time domain, a frequency domain, or a space domain. The channel diversity gain refers to a low correlation of channels in at least one dimension, such as the time domain, the frequency domain, or the space domain; or statistically independent features possessed by channels in a plurality of times of transmission in at least one dimension such as the time domain, the frequency domain, or the space domain, so that these independent channels can be used in a communication process, thereby reducing an impact of channel fading.

The spatial channel diversity gain may be, for example, independent channel diversity gains of a plurality of stations. There may be a plurality of network devices in a network. A coordinated transmission, that is, a multi-station coordinated transmission technology, may be performed between the plurality of network devices 210, 220, and 230. In the multi-station coordinated transmission technology, the terminal device may be scheduled by a plurality of network devices. For example, the plurality of network devices 210, 220, and 230 schedule the terminal device 205 to receive a plurality of pieces of data. In this way, a user throughput can be improved, and a user-perceived rate can be improved. On the contrary, the terminal device 205 may alternatively send data to the plurality of network devices, and the plurality of network devices 210, 220, and 230 may separately receive the data. The plurality of network devices 210, 220, and 230 may further combine the data. The plurality of network devices 210, 220, and 230 may be geographically different, so that a plurality of independent channels from the plurality of network devices to the terminal device have low correlation. Therefore, the multi-station coordinated transmission technology may be applied to a scenario that has a relatively high requirement on communication reliability, so that a system can use a low-correlation channel diversity gain.

Currently, in a uRLLC scenario of an NR system, a plurality of repeated-transmission manners based on the multi-station coordinated transmission technology may be supported. The repetition transmission manners may be classified into repeated-transmission manners in space domain, frequency domain, and time domain. Currently, there are five repeated-transmission manners. In this specification, the five repeated-transmission manners are referred to as transmission modes. A network device may send data to a terminal device by using one or more transmission modes. The terminal device needs to identify the transmission mode used by the network device, so as to perform corresponding receiving and processing.

The embodiments of this application provide a method for determining a transmission mode and an apparatus, so that a terminal device can identify a transmission mode used by a network device, so as to perform corresponding receiving and processing. The embodiments of this application may be used to distinguish between a plurality of transmission modes in a uRLLC scenario, and the plurality of transmission modes are not limited to the five current transmission modes. The embodiments of this application may further be used to distinguish between a multi-station uRLLC scenario and a multi-station eMBB scenario.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

Before the embodiments of this application are described, the following first describes names or terms in the embodiments of this application.

(1) Several Transmission Modes Used in the Embodiments of this Application

1. Space Division Multiplexing Mode

The SDM mode is a repeated-transmission mode in space domain, and means that a plurality of TRPs jointly transmit a same transport block. A TRP schedules data blocks on a same time-frequency resource, and the data blocks are mapped to different antenna ports. Therefore, a diversity gain in the space domain can be used.

Data is sent from a media access control (MAC) layer to a physical layer in a form of one or more transport blocks (TB). One TB is sent from the MAC layer to the physical layer. A network device performs channel coding processing on each TB, performs rate matching on the transport block obtained after the channel coding processing, and stores the transport block into a ring buffer. A codeword (CW) obtained from the ring buffer based on a redundancy version (RV) may be considered as a TB with error protection. After layer mapping is performed on the codeword, the codeword is mapped to one or more data transmission layers (layer for short), and each data transmission layer corresponds to one valid data stream. A data stream at each layer is mapped to an antenna port through antenna port mapping. An antenna port mapping process may also be referred to as precoding, that is, a process of mapping a data stream at each layer to an antenna port by using a precoding matrix. The precoded data stream is mapped to a physical time-frequency resource and converted into a signal. The signal is sent by the network device.

Figure 3:
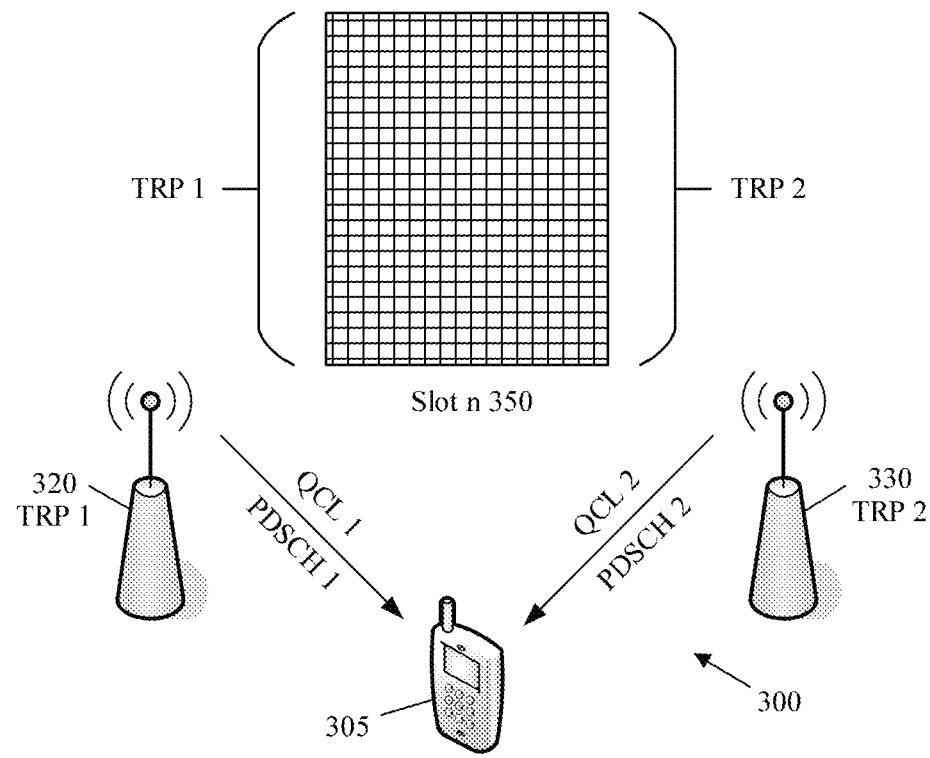
FIG. 3 is a diagram of an example of a network architecture and transmission in a space division multiplexing mode.

For example, FIG. 3 is a diagram of an example of a network architecture 300 and transmission in a space division multiplexing mode. In FIG. 3, the network architecture 300 includes a TRP 1 320 and a TRP 2 330 schedule a same time-frequency resource, and a time domain scheduling unit of the time-frequency resource is a slot or a mini-slot. An antenna port used by the TRP 1 320 to transmit a physical downlink shared channel (PDSCH) 1 is different from an antenna port used by the TRP 2 to transmit a PDSCH 2.

Figure 4:
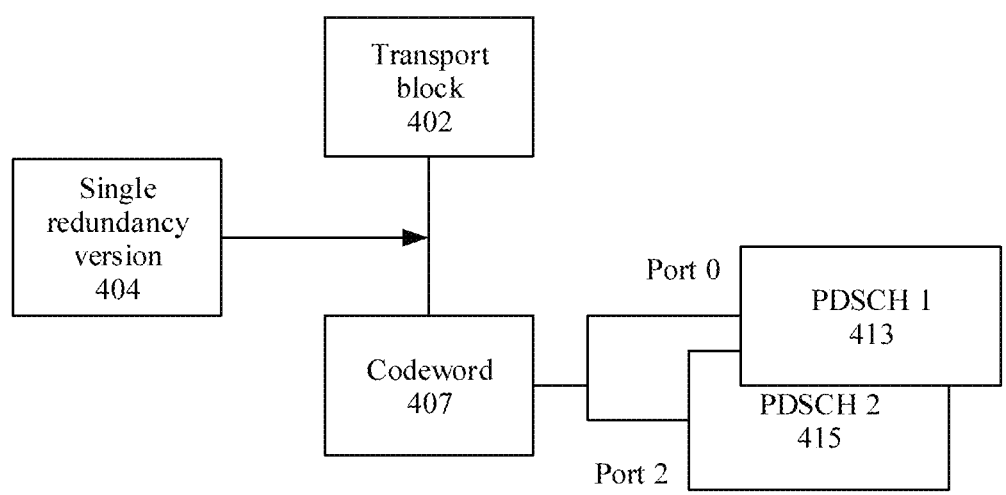
FIG. 4 is a diagram of a physical layer processing procedure in a space division multiplexing mode.

Different antenna ports relate to a physical layer processing procedure, referring to FIG. 4. FIG. 4 is a diagram of a physical layer processing procedure in a space division multiplexing mode.

In FIG. 4, a TRP 1 and a TRP 2 jointly transmit one transport block 402, and the TRP 1 or the TRP 2 may perform channel coding processing and rate matching processing on the transport block 402. The channel coding processing and the rate matching processing are performed on the transport block, and a codeword (CW) 407 is obtained based on a single redundancy version 404. Then, the CW 407 is mapped to two data transmission layers, for example, a layer 0 and a layer 1, in a layer mapping process. A data stream at the data transmission layer 0 is mapped to an antenna port 0 through antenna port mapping; and a data stream at the data transmission layer 1 is mapped to an antenna port 2 through antenna port mapping. Then, resource mapping is performed on the data stream at the antenna port 0 to obtain a PDSCH 1 413, and resource mapping is performed on the data stream at the antenna port 2 to obtain a PDSCH 2 415. The PDSCH 1 413 and the PDSCH 2 415 are mapped to a same time-frequency resource. Further, the TRP 1 may send the PDSCH 1 413, and the TRP 2 may send the PDSCH 2 415. The PDSCH 1 413 carries half of information bits of the transport block, and the PDSCH 2 415 carries the other half of the information bits of the transport block 402.

In an embodiment, in an antenna port mapping process, a data stream at the data transmission layer 0 is mapped to a CDM group 0 through antenna port mapping; and a data stream at the data transmission layer 1 is mapped to a CDM group 1 through antenna port mapping. That is, for the SDM mode, in the antenna port mapping process, data streams at different data transmission layers may be mapped to different CDM groups.

The SDM mode is the same as a multi-station eMBB transmission mode. The SDM mode may also be referred to as a scheme 1a, a space division multiplexing scheme, or the like.

2. Frequency Division Multiplexing Mode

The FDM mode is a repeated-transmission mode in frequency domain, and means that a plurality of TRPs jointly transmit a same transport block, or a plurality of TRPs each transmit one transport block. Frequency domain resources scheduled by different TRPs are different, and time domain resources scheduled by the different TRPs are the same. In the FDM mode, one or more antenna ports may be used by a plurality of TRPs in a transmission process.

Figure 5:
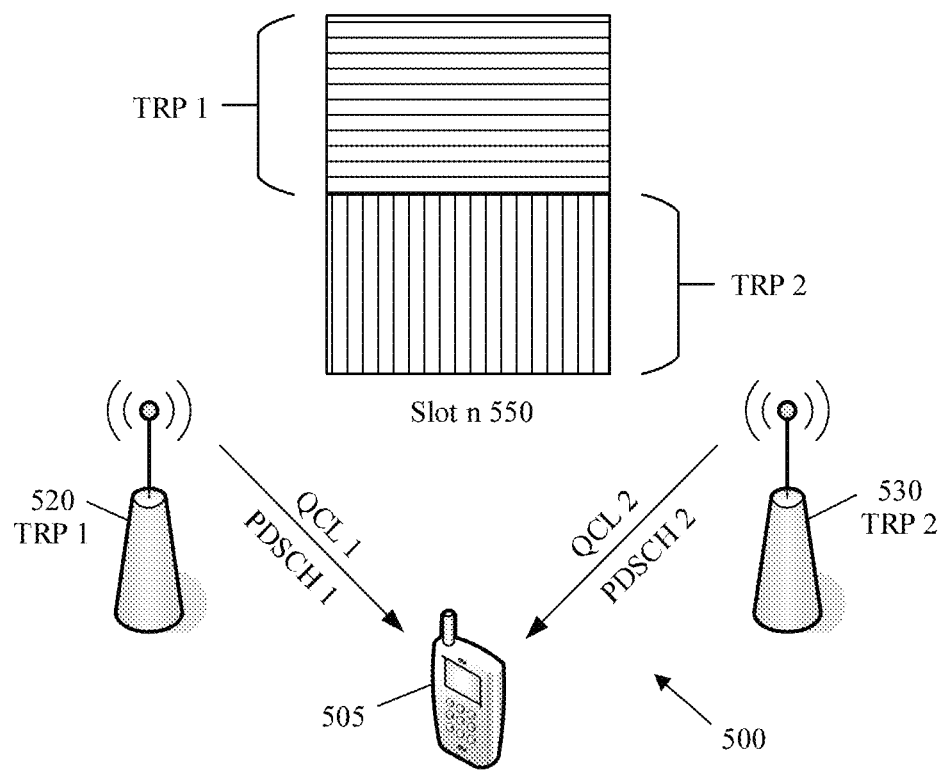
FIG. 5 is a diagram of an example of transmission in a frequency division multiplexing mode.

For example, FIG. 5 is a diagram of an example of transmission in a frequency division multiplexing mode. In FIG. 5, time domain resources scheduled by a TRP 1 520 and a TRP 2 530 are the same, and frequency domain resources scheduled by the TRP 1 520 and the TRP 2 530 are different and do not overlap each other at all. That two TRPs 520 and 530 perform FDM transmission is equivalent to that each TRP schedules half of frequency domain resources. Therefore, there is a power boost of 3 decibels (dB), and this is a main gain source of the FDM mode.

The FDM mode may be classified into a single-codeword-based FDM mode and a multi-codeword-based FDM mode. The single-codeword-based FDM mode is an FDM mode based on a single redundancy version of one codeword. The multi-codeword-based FDM mode is an FDM mode based on a plurality of redundancy versions of a plurality of codewords.

For ease of differentiation, in the embodiments of this application, the single-codeword-based FDM mode is referred to as a first FDM mode, and the multi-codeword-based FDM mode is referred to as a second FDM mode. The single-codeword-based FDM mode may also be referred to as a scheme 2a or the like, and the multi-codeword-based FDM mode may also be referred to as a scheme 2b or the like.

Figure 6:
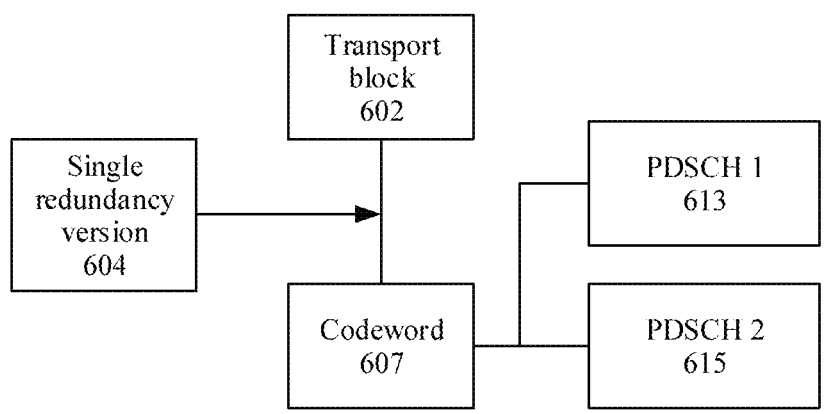
FIG. 6 is a diagram of a physical layer processing procedure in a first frequency division multiplexing mode.

For the first FDM mode, refer to FIG. 6, which is a diagram of a physical layer processing procedure in a first frequency division multiplexing mode. In FIG. 6, a TRP 1 and a TRP 2 jointly transmit one transport block 602, and the TRP 1 or the TRP 2 may perform channel coding processing and rate matching processing on the transport block 602. After the channel coding processing and the rate matching processing are performed on the transport block 602, a CW 607 is obtained based on a single redundancy version. Then, the CW 607 is mapped to one or two data transmission layers in a layer mapping process. Then, the CW 607 is mapped to one or two antenna ports in an antenna port mapping process. If the CW 607 is mapped to one data transmission layer in the layer mapping process, the CW 607 is mapped to one antenna port in the antenna port mapping process. If the CW 607 is mapped to two data transmission layers in the layer mapping process, the CW 607 is mapped to two antenna ports in the antenna port mapping process. Then, in a resource mapping process, the CW 607 is mapped to two parts of frequency domain resources that do not overlap each other at all, to obtain a PDSCH 1 613 and a PDSCH 2 615. The PDSCH 1 613 carries half of information bits of the transport block 602, and the PDSCH 2 615 carries the other half of the information bits of the transport block 602.

Figure 7:
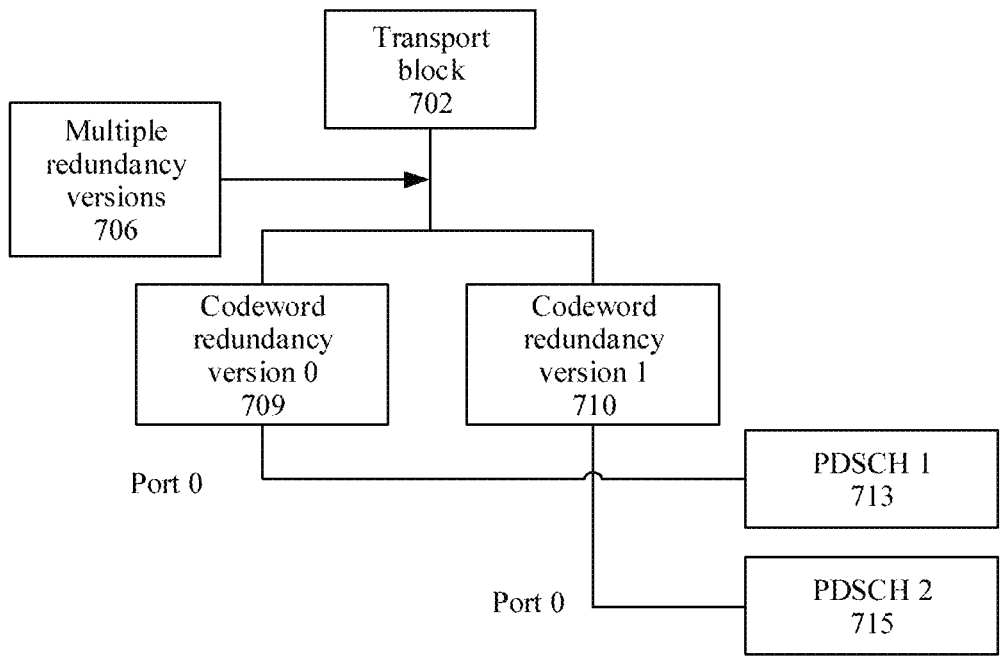
FIG. 7 is a diagram of a physical layer processing procedure in a first frequency division multiplexing mode.

For the second FDM mode, refer to FIG. 7, which is a diagram of a physical layer processing procedure in a second frequency division multiplexing mode. In FIG. 7, the TRP 1 and the TRP 2 each transmit an identical transport block 702. After channel coding processing and rate matching processing are performed on one transport block 702, a CW 709 is obtained based on a redundancy version 0. After channel coding processing and rate matching processing are performed on the other transport block 702, another CW 710 is obtained based on a redundancy version 1. The redundancy versions of the two CWs 709 and 710 are different. Then, the two CWs 709 and 710 are mapped to a same data transmission layer in a layer mapping process. Then, the two CWs 709 and 710 are mapped to a same antenna port, for example, a port 0, in an antenna port mapping process. Then, in a resource mapping process, the two CWs are mapped to two parts of frequency domain resources that do not overlap each other at all, to obtain a PDSCH 1 713 and a PDSCH 2 715. The PDSCH 1 713 and the PDSCH 2 715 carry information bits of a same transport block 702, but different redundant bits are added. A terminal device may perform soft bit combination on information, to obtain a combination gain.

3. Time Division Multiplexing Mode

The TDM mode is a repeated-transmission mode in time domain, and means that a plurality of TRPs each transmit one transport block. Time domain resources scheduled by different TRPs do not overlap each other at all, and frequency domain resources transmitted and scheduled by the different TRPs are the same. In the TDM mode, one or more antenna ports may be used by a plurality of TRPs in a transmission process. In the TDM mode, low time correlation of channels is used to improve transmission robustness.

The TDM mode may be classified into a TDM mode within a slot unit and a TDM mode between slot units. The slot unit may be a slot or a mini-slot. One slot may include 14 symbols, and may be designed to include another quantity of symbols in the future. A quantity of symbols included in one mini-slot is less than a quantity of symbols included in one slot. For example, one mini-slot may include two, six, or seven symbols. The symbol may be an orthogonal frequency division multiplexing (OFDM) symbol, a discrete Fourier transform spread spectrum orthogonal frequency division multiplexing DFT-S-OFDM) symbol, or the like.

For ease of differentiation, in the embodiments of this application, the TDM mode within a slot unit is referred to as a first TDM mode, and the TDM mode between slot units is referred to as a second TDM mode. The TDM mode within a slot unit may also be referred to as a scheme 3, a mini-slot-based TDM mode, or the like. The TDM mode between slot units may also be referred to as a scheme 4, a slot-based TDM mode, a cross-slot-unit TDM mode, or the like.

Figure 8:
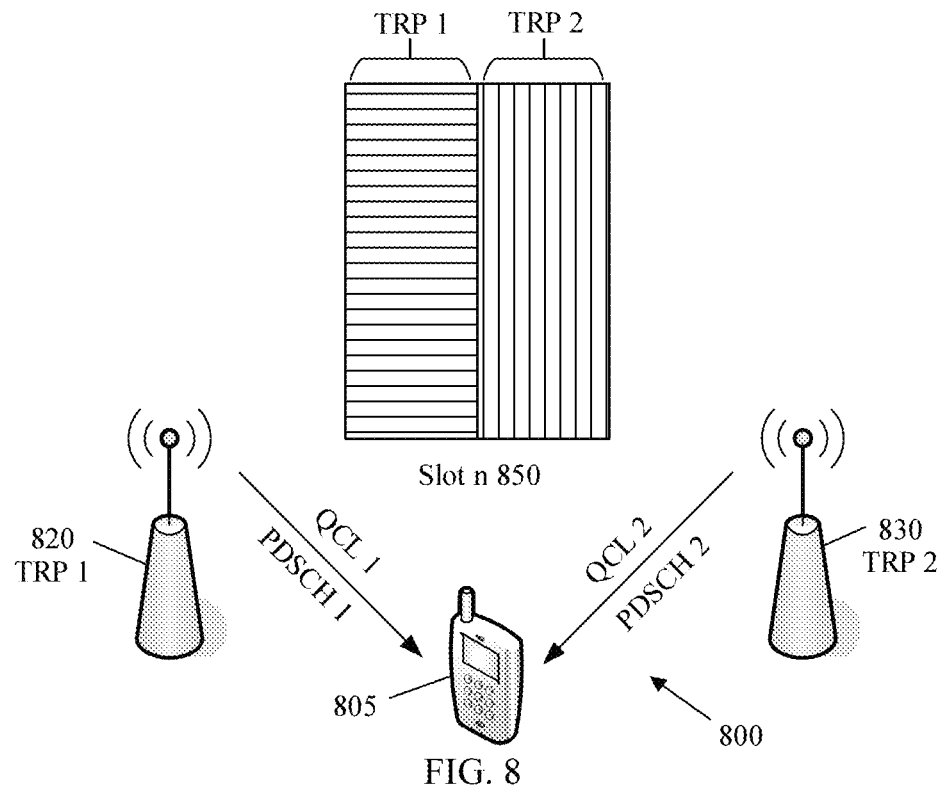
FIG. 8 is a diagram of an example of transmission in a first time division multiplexing mode.

For example, FIG. 8 is a diagram of an example of transmission in a first time division multiplexing mode. In FIG. 8, frequency domain resources scheduled by a TRP 1 and a TRP 2 are the same, and time domain resources scheduled by the TRP 1 and the TRP 2 are all located in a slot n and do not overlap each other at all.

Figure 9:
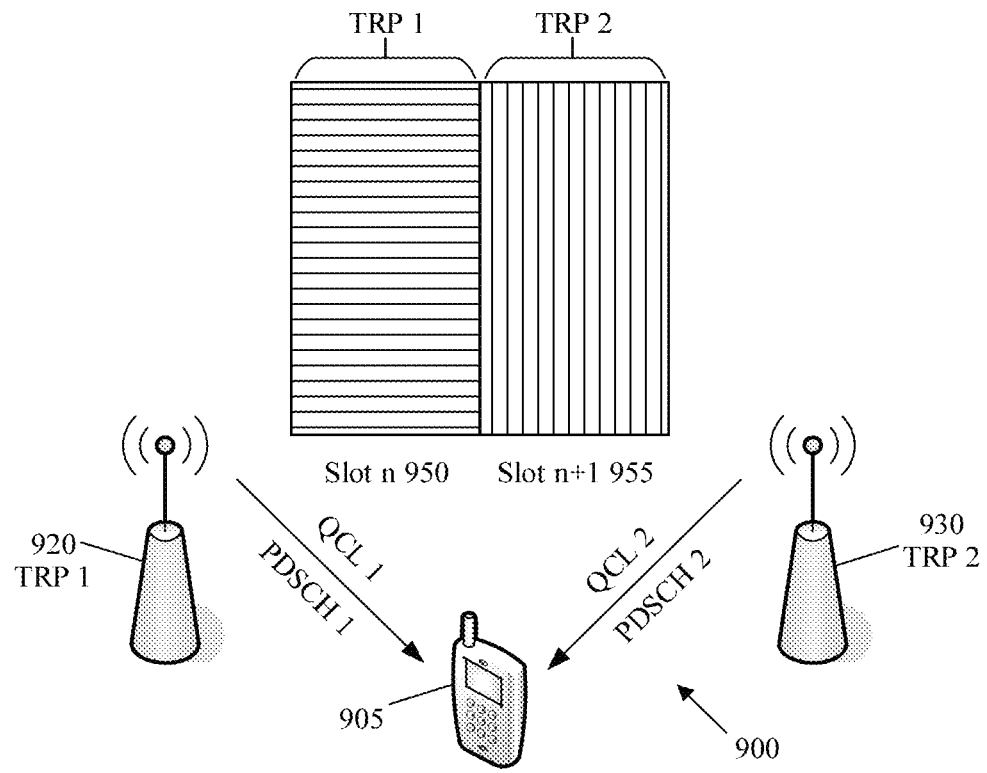
FIG. 9 is a diagram of an example of transmission in a second time division multiplexing mode.

For example, FIG. 9 is a diagram of an example of transmission in a second time division multiplexing mode. In FIG. 9, frequency domain resources scheduled by a TRP 1 and a TRP 2 are the same, a time domain resource scheduled by the TRP 1 is located in a slot n, and a time domain resource scheduled by the TRP 2 is located in a slot n+1. The time domain resources are different and do not overlap each other at all.

Figure 10:
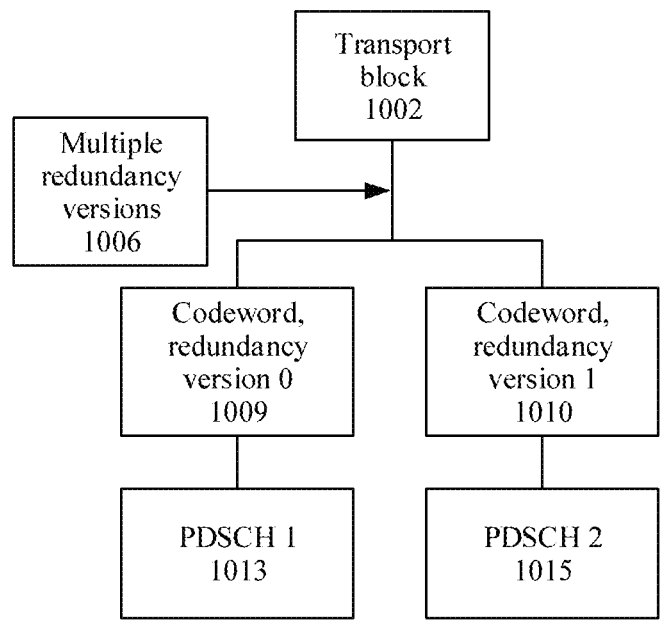
FIG. 10 is a diagram of a physical layer processing procedure in a time division multiplexing mode.

FIG. 10 is a diagram of a physical layer processing procedure in a time division multiplexing mode. In FIG. 10, a TRP 1 and a TRP 2 each transmit an identical transport block. Channel coding processing and rate matching processing are performed on one transport block, and a CW is obtained based on a redundancy version. Channel coding processing and rate matching processing are performed on the other transport block, and another CW is obtained based on a redundancy version. The redundancy versions of the two CWs may be the same or may be different. In FIG. 10, for example, the redundancy versions of the two CWs are different. In a layer mapping process, the two CWs are mapped to one or more data transmission layers. In an antenna port mapping process, the two CWs are mapped to one or more antenna ports. Finally, in a resource mapping process, two PDSCHs are mapped to a same frequency domain resource, but are transmitted at different time. Therefore, time domain resources of a PDSCH 1 and a PDSCH 2 are different.

In addition to the first TDM mode and the second TDM mode, the TDM mode may further include an integrated transmission mode of the first TDM mode and the second TDM mode. In the integrated transmission mode, repeated-transmission of a PDSCH occupies both a symbol within a slot and a symbol between slots. In other words, the PDSCH is repeatedly transmitted both within a slot and between slots. For example, if a length of a time domain resource occupied by the PDSCH is two consecutive symbols, in one repeated-transmission process of a TRP 1 and a TRP 2, the time domain resource occupied by the PDSCH may include the third, the fourth, the ninth, and the tenth symbols in a slot n, and the third, the fourth, the ninth, and the tenth symbols in a slot n+1. The PDSCH on the ninth and the tenth symbols in the slot n is a repetition of the PDSCH on the third and the fourth symbols in the slot n. The PDSCH on the third and the fourth symbols in the slot n+1 is a repetition of the PDSCH on the third and the fourth symbols in the slot n between slots.

In the physical layer processing procedures of the foregoing several transmission modes, a relationship between an antenna port index and a DMRS port index is: Antenna port index=DMRS port index+1000.

It should be noted that names of the foregoing several transmission modes are used as examples, and do not constitute a limitation on the embodiments of this application. The foregoing several transmission modes may also be represented other names. Any other transmission modes whose technical essences or principles are the same as or similar to those of the foregoing several transmission modes, they shall fall within to the protection scope of the embodiments of this application.

It should be noted that after determining one or more transmission modes according to the embodiments provided in this application, a terminal device performs a behavior or interprets some parameters or parameter fields in a way different from the current technology. Therefore, when the terminal device performs the following behavior or interpretation, it may also be considered as determining a corresponding transmission mode by the terminal device. In other words, a process in which the terminal device determines the transmission mode may be reflected by performing a corresponding operation or interpreting some parameters or some parameter fields by the terminal device.

In the SDM mode, a terminal device maps different TCI states to different CDM groups corresponding to different DMRS ports. For example, the terminal device may perform one-to-one mapping in ascending order of identifiers of the CDM group. This operation implicitly indicates that the terminal device determines, according to the method in the embodiments of this application, that the transmission mode is the SDM mode.

In the first FDM mode, a terminal device maps different TCI states to different frequency domain resources. In addition, the terminal device performs one or more of the following operations:

1. Read a value of a redundancy version (RV) field in DCI. For example, reading may be performed in the manner described in Rel-15.

2. Obtain a corresponding RV based on an RV table. Data carried on different frequency domain resources uses a same RV. For example, an RV table in Rel-15 may be used, and one RV table is shown in the following Table 0-1.

TABLE 0-1

| Value of the redundancy version field | Value of $rv_{id}$ to be applied |
| --- | --- |
| 00 | 0 |
| 01 | 1 |
| 10 | 2 |
| 11 | 3 |

Any one or more of the foregoing operations implicitly indicate that the terminal device determines, according to the method in the embodiments of this application, that the transmission mode is the first FDM mode.

In the second FDM mode, a terminal device maps different TCI states to different frequency domain resources. In addition, the terminal device performs one or more of the following operations:

1. Obtain an RV based on an RV table. A feature of the RV table is that each entry may indicate more than one RV. In this case, the terminal device associates different redundancy versions with different TCI states. The RV table is shown in the following Table 0-2 and Table 0-3, where a value is one of RVs {0, 2, 3, 1}, and a sequence may be changed. For example, when the terminal device determines, according to the method in the embodiments, that the transmission mode is the second FDM mode, the terminal device obtains more than one RV (for example, 0 and 2) from the RV table based on a value of an RV field in DCI. In this case, the terminal device separately associates the RV 0 and the RV 2 with the first and second TCI states, and performs a subsequent operation, for example, performs soft combination on data carried on different frequency domain resources to which the TCI states are mapped.

TABLE 0-2

| Redundancy version ID indicated by DCI for scheduling a PDSCH | RV associated with the first TCI state and RV associated with the second TCI state |
| --- | --- |
| Value 1 | 0, 2 |
| Value 2 | 0, 3 |
| Value 3 | 0, 1 |
| Value 4 | 0, 0 |

TABLE 0-3

| Redundancy version ID indicated by DCI for scheduling a PDSCH | RV associated with the first TCI state and RV associated with the second TCI state |
| --- | --- |
| Value 1 | 0, 2 |
| Value 2 | 0, 3 |
| Value 3 | 2, 0 |
| Value 4 | 3, 0 |

2. Read the value of the redundancy version field in the DCI and perform additional behavior. For example, the RV obtained from the RV field is used to indicate only an RV (similar to Rel-15) of one PDSCH (or data carried on a frequency domain resource to which the PDSCH is mapped), and an RV of another PDSCH is the RV 0 by default. In this case, the terminal device respectively associates the two RVs with the first and the second TCI states, and performs a subsequent operation, for example, performs soft combination on data carried on different frequency domain resources to which the TCI states are mapped.

3. Use a new RV field different from the RV field in Rel-15. The terminal device may directly obtain more than one RV from the new RV field, respectively associate the more than one RV with more than one TCI state, and then perform a subsequent operation. Details are not described herein.

Any one or more of the foregoing operations implicitly indicate that the terminal device determines, according to the method in the embodiments of this application, that the transmission mode is the second FDM mode.

In the first TDM mode, a terminal device maps different TCI states to different time domain resources. In addition, the terminal device performs one or more of the following operations, for example:

1. The terminal device is limited to performing PDSCH transmission only within a current slot.

2. The terminal device performs X times of PDSCH transmission within the current slot, where X may be 2 or 4. In this case, the terminal device sequentially maps the different TCI states to X different time domain resources. A mapping manner may be one-to-one correspondence or cyclic mapping. For example, if X=2, TCI states associated with two PDSCHs are {TCI state #1, TCI state #2}; if X is 4, TCI states associated with four PDSCHs are {TCI state #1, TCI state #2, TCI state #1, TCI state #2}.

3. The terminal device obtains a quantity A of time domain repetitions by reading a field or parameter, for example, a field indicating a quantity of repetitions or time domain resource allocation, and sequentially maps the different TCI states to A different time domain resources.

Any one or more of the foregoing operations implicitly indicate that the terminal device determines, according to the method in the embodiments of this application, that the transmission mode is the first TDM mode.

In the second TDM mode, a terminal device maps different TCI states to different time domain resources. In addition, the terminal device performs one or more of the following operations, for example:

1. The terminal device is limited to performing PDSCH transmission only within N consecutive slots.

2. The terminal device obtains a quantity B of time domain repetitions by reading a field or parameter, for example, a field indicating a quantity of repetitions or time domain resource allocation, and sequentially maps the different TCI states to B consecutive slots. There may be a plurality of mapping manners, for example, a mapping manner the same as that in the first TDM mode. This is not limited herein.

3. The terminal device reads RRC signaling pdsch-AggregationFactor indicating a quantity of transmission repetitions in time domain in Rel-15, or higher layer signaling having a similar function, and sequentially maps the different TCI states to pdsch-AggregationFactor consecutive slots. A mapping manner is not limited. Any one or more of the foregoing operations implicitly indicate that the terminal device determines, according to the method in the embodiments of this application, that the transmission mode is the second TDM mode.

(2) Transmission Configuration Indication (TCI)

The TCI is an indication field in dynamic control signaling, and indicates a TCI state of each data transmission process. The dynamic control signaling may be downlink control information (DCI).

The TCI state is a field in the DCI that is used to indicate a quasi co-location (QCL) of a PDSCH antenna port, is used to configure a quasi co-location relationship between one or two downlink reference signals and a DMRS of a PDSCH, and may be understood as a channel feature of the current PDSCH transmission process. In this way, the terminal device can learn of indication information of a large-scale channel parameter relationship of the received PDSCH based on the TCI state, and further demodulate, based on channel estimation, data transmitted on the PDSCH. In a multi-station coordinated transmission scenario, for a terminal device, different TRPs have different TCI states in a PDSCH transmission process.

Based on a quantity of TCI states, a single-station transmission scenario and a multi-station transmission scenario may be distinguished. The TCI state is indication information used to indicate the large-scale channel parameter of the PDSCH. Therefore, a maximum characteristic of the multi-station transmission scenario is that there are a plurality of TRPs with completely different channel conditions, so that a diversity gain of a channel can be used. When there are a plurality of TCI states, the terminal device may consider that a current transmission scenario is the multi-station transmission scenario.

(3) Quasi Co-Location

A QCL relationship is used to indicate that a plurality of resources have one or more same or similar communication features. For example, if two antenna ports have a quasi co-location relationship, a large-scale channel characteristic of transmitting one signal by one antenna port may be deduced from a large-scale channel characteristic of transmitting one signal by the other antenna port. Signals corresponding to antenna ports that have a QCL relationship have a same parameter, or a parameter of one antenna port may be used to determine a parameter of another antenna port that has a QCL relationship with the antenna port, or two antenna ports have a same parameter, or a parameter difference between two antenna ports is less than a preset value. The parameter may include one or more of the following large-scale channel parameters: a delay spread, a Doppler spread, a Doppler shift, an average delay, and an average gain, and a spatial receive parameter. The spatial receive parameter may include one or more of an angle of arrival (AoA), a dominant angle of arrival (Dominant AoA), an average angle of arrival (Average AoA), an angle of departure (AoD), a channel correlation matrix, a power angle spread spectrum of the angle of arrival, an average angle of departure (Average AoD), a power angle spread spectrum of the angle of departure, a transmit channel correlation, a receive channel correlation, transmit beamforming, receive beamforming, a spatial channel correlation, a spatial filter or a spatial filtering parameter or a spatial receive parameter, and the like.

In FIG. 3, FIG. 5, and FIG. 8, the QCL sent by the TRP 1 to the terminal device is different from the QCL sent by the TRP 2 to the terminal device. The terminal device may learn, based on the different QCLs, that data comes from different TRPs, so that the terminal device can determine, based on the plurality of QCLs, that a current transmission scenario is a multi-station transmission scenario.

(4) CDM Group

The CDM group may also be described as a CDM antenna port group. A plurality of antenna ports in the CDM group may use a same time-frequency resource, but use different code domain resources. The terminal device assumes that there is a QCL relationship between DMRS ports in one CDM group, in other words, channel condition features of DMRS ports in one CDM group are similar. This may be understood as that the DMRS ports are from a same TRP, or this may be considered that data transmitted by antenna ports in a same CDM group can be simultaneously received.

It should be noted that DMRS ports of different TRPs are usually considered to have no QCL relationship, that is, have a non-QCL relationship.

A DMRS CDM group may also be described as a DMRS CDM antenna port group, and is used to indicate a CDM group to which a DMRS port for transmitting a DMRS belongs.

Based on the network architecture shown in FIG. 1 or FIG. 2, the following describes in detail a method for determining a transmission mode provided in the embodiments of this application. It should be noted that, in the descriptions, names of information or data exchanged between the terminal device and the network device are used as examples, and do not constitute a limitation on the embodiments of this application.

Figure 11:
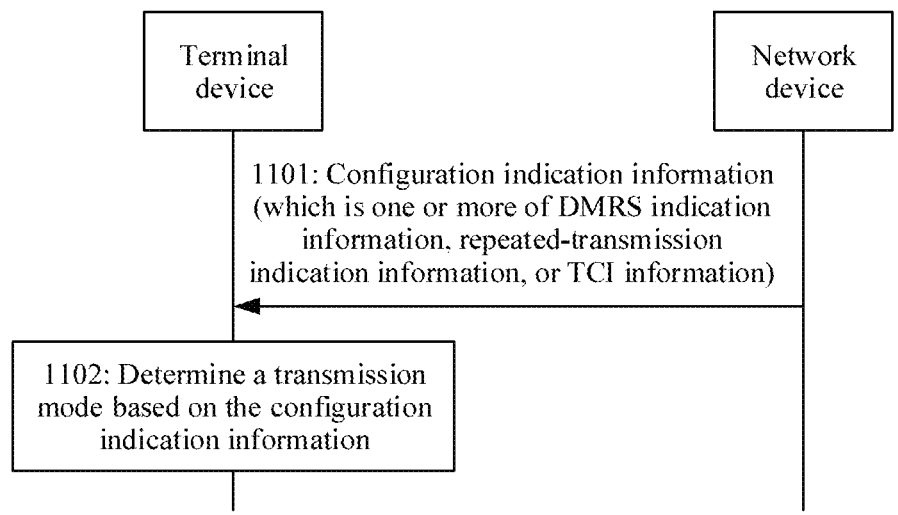
FIG. 11 is a flowchart of a method for determining a transmission mode according to an embodiment of this application.

FIG. 11 is a flowchart of a method for determining a transmission mode according to an embodiment of this application. The procedure may include, but is not limited to, the following operations.

Step 1101: A network device transmits configuration indication information to a terminal device. Correspondingly, the terminal device receives the configuration indication information from the network device.

The configuration indication information is one or more of DMRS indication information, repeated-transmission indication information, or TCI information.

The network device may configure the DMRS indication information for the terminal device, and send the DMRS indication information to the terminal device. The network device may send the DMRS indication information to the terminal device by using dynamic control signaling, and the dynamic control signaling may be DCI. In other words, the DMRS indication information may be carried in the DCI.

The DMRS indication information may be a value or an index, and is used as an entry of a DMRS table, to search the DMRS table for a DMRS parameter corresponding to the value. For example, the following Table 1 is a DMRS table in Release 15, and the DMRS table is a DMRS table whose DMRS type=1 and that has one symbol. The DMRS table is used as an example, and does not constitute a limitation on the embodiments of this application.

TABLE 1

| Value | Quantity of CDM groups without data | DMRS port |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |

TABLE 1-continued

| Value | Quantity of CDM groups without data | DMRS port |
|---|---|---|
| 9 | 2 | 0-2 |
| 10 | 2 | 0-3 |
| 11 | 2 | 0, 2 |
| 12-15 | Reserved | Reserved |

Table 1 is known to both the network device and the terminal device. In other words, a DMRS table is configured on both the network device and the terminal device. The terminal device may obtain, by searching the table, two DMRS parameters corresponding to a value. The two DMRS parameters are respectively a quantity of CDM groups without data and a DMRS port. The quantity of CDM groups without data is a quantity of DMRS CDM groups without data (or the number of DMRS CDM group(s) without data), and is used for rate matching. The DMRS port is used to notify of a DMRS port and a CDM group that are used by the terminal device. In Table 1, there are four DMRS port identifiers: [0], [1], [2], and [3]. A DMRS port [0] and a DMRS port [1] belong to a CDM group {0}, in other words, the CDM group {0} includes the DMRS port [0] and the DMRS port [1]. A DMRS port [2] and a DMRS port [3] belong to a CDM group {1}, in other words, the CDM group {1} includes the DMRS port [2] and the DMRS port [3].

For example, a value indicated by the DMRS indication information is 2, the terminal device may obtain, by searching the table, that a quantity of CDM groups without data is 1 and DMRS ports are [0] and [1]. The two DMRS ports belong to the CDM group {0}. For another example, a value indicated by the DMRS indication information is 11, the terminal device may obtain, by searching the table, that a quantity of CDM groups without data is 2 and DMRS ports are [0] and [2]. The two DMRS ports respectively belong to the CDM group {0} and the CDM group {1}.

The DMRS indication information may directly indicate a value in the DMRS table, and further indirectly indicate one or more DMRS port identifiers corresponding to the value, or indirectly indicate a CDM group corresponding to the value, or indirectly indicate a quantity of CDM groups without data and one or more DMRS port identifiers corresponding to the value. It may be understood that the DMRS indication information is used to indicate one or more DMRS port identifiers, or is used to indicate one or more DMRS port identifiers and a CDM group without data.

In an embodiment, when the DMRS indication information is used to indicate one or more DMRS port identifiers, the DMRS indication information may be used to distinguish between an SDM mode and an FDM mode. In this manner, because of physical layer processing characteristics of the SDM mode and the FDM mode, the two modes are distinguished based on the one or more DMRS port identifiers. Based on a physical layer processing procedure, at least two DMRS ports are used for transmission in the SDM mode, and the DMRS ports are from different CDM groups; and one or more DMRS ports are used for transmission in the FDM mode, and transmission is limited to be performed in a case in which a maximum rank is 2. Therefore, the SDM mode and the FDM mode are distinguished based on the one or more DMRS port identifiers.

In an embodiment, when the DMRS indication information is used to indicate one or more DMRS port identifiers and a CDM group without data, the DMRS indication information may be used to distinguish between an SDM mode, an FDM mode, and a first TDM mode. In this manner, a transmission mode corresponding to each value in Table 1 may be determined.

The network device may configure repeated-transmission indication information for the terminal device, and send the repeated-transmission indication information to the terminal device. The network device may send the repeated-transmission indication information to the terminal device by using higher layer signaling. The higher layer signaling may be, for example, radio resource control (RRC) signaling, that is, the repeated-transmission indication information is carried in the RRC signaling.

In an embodiment, the repeated-transmission indication information may be used to indicate a time domain repeated-transmission parameter. Manner 1: The time domain repeated-transmission parameter is used to indicate a quantity of repetitions in time domain, and may be an aggregation factor. The aggregation factor may be used to distinguish the TDM mode from other transmission modes. Manner 2: The time domain repeated-transmission parameter may be a PDSCH aggregation factor (pdsch-AggregationFactor), and a value of the pdsch-AggregationFactor may be 2, 4, or 8. It indicates that repeated transmission is performed in pdsch-AggregationFactor consecutive slots. The pdsch-AggregationFactor may be used to distinguish a second TDM mode from other transmission modes. Optionally, the repeated-transmission indication information is further used to indicate a frequency domain repeated-transmission parameter, and the frequency domain repeated-transmission parameter is used to distinguish between a first FDM mode and a second FDM mode.

In an embodiment, the repeated-transmission indication information may be used to indicate a first time domain repeated-transmission parameter and a second time domain repeated-transmission parameter. The first time domain repeated-transmission parameter may be represented as a mini-slot aggregation factor, and the second time domain repeated-transmission parameter may be represented as a slot aggregation factor. The first time domain repeated-transmission parameter and the second time domain repeated-transmission parameter may be used to distinguish between the TDM mode and other transmission modes, and may further be used to distinguish between a first TDM mode and a second TDM mode after the transmission mode is determined as the TDM mode.

In an embodiment, the repeated-transmission indication information may be used to indicate a frequency domain repeated-transmission parameter, a first time domain repeated-transmission parameter, and a second time domain repeated-transmission parameter. In this case, the repeated-transmission indication information may be represented as {a, b, c}. For example, a represents the frequency domain repeated-transmission parameter, b represents the first time domain repeated-transmission parameter, and c represents the second time domain repeated-transmission parameter. In this manner, the terminal device may determine the transmission mode based on the repeated-transmission indication information and the quantity of CDM groups.

The network device may configure the TCI information for the terminal device, and send the TCI information to the terminal device. The network device may send the DMRS indication information to the terminal device by using dynamic control signaling, and the dynamic control signaling may be DCI. In other words, the DMRS indication information may be carried in the DCI. When the network device configures the TCI information and the DMRS indication information for the terminal device, the network device may send the TCI information and the DMRS indication information to the terminal device by using same DCI, or may send the TCI information and the DMRS indication information to the terminal device by using different DCI.

The TCI information is used to indicate a TCI state in a transmission process. The TCI information may be a TCI codepoint, and one TCI codepoint corresponds to one or more TCI states. In a case of multi-station transmission, one TCI codepoint may indicate two or more TCI states. If the TCI information indicates two or more TCI states, the terminal device may determine that a current transmission scenario is a multi-station transmission scenario.

Step 1102: The terminal device determines the transmission mode based on the configuration indication information.

Before determining the transmission mode based on the configuration indication information, the terminal device may first determine whether the current transmission scenario is a multi-station transmission scenario. After determining that the current transmission scenario is a multi-station transmission scenario, the terminal device determines the transmission mode based on the configuration indication information.

The terminal device may determine, based on a quantity of TCI states indicated by the TCI information, whether the current transmission scenario is a multi-station transmission scenario. If the quantity of TCI states is greater than or equal to 2, the terminal device may determine that the current transmission scenario is a multi-station transmission scenario. The terminal device may determine, based on a received QCL, whether the current transmission scenario is a multi-station transmission scenario. If a plurality of different QCLs are received, the terminal device may determine that the current transmission scenario is a multi-station transmission scenario.

The terminal device obtains the configuration indication information, and determines the transmission mode based on the obtained configuration indication information. That the terminal device determines the transmission mode based on different configuration indication information is described below by using the following several embodiments.

In Embodiment 1, configuration indication information is repeated-transmission indication information.

The repeated-transmission indication information may be used to indicate a time domain repeated-transmission parameter, or may be used to indicate a first time domain repeated-transmission parameter and a second time domain repeated-transmission parameter, or may be used to indicate a frequency domain repeated-transmission parameter, a first time domain repeated-transmission parameter, and a second time domain repeated-transmission parameter.

For a case in which the repeated-transmission indication information is used to indicate the time domain repeated-transmission parameter:

Manner 1: The time domain repeated-transmission parameter is used to indicate a quantity of repetitions in time domain, and may be AggregationFactor. After a terminal device determines that a current transmission scenario is a multi-station transmission scenario, if the terminal device has obtained the time domain repeated-transmission parameter, it indicates that a network device has configured the time domain repeated-transmission parameter for the terminal device. In this case, the terminal device may determine that a transmission mode is a TDM mode. If the terminal device has not obtained the time domain repeated-transmission parameter, it indicates that the network device has not configured the time domain repeated-transmission parameter for the terminal device. In this case, the terminal device may determine that the transmission mode is an SDM mode, an FDM mode, or an integrated mode of an SDM mode and an FDM mode. When the terminal device has not obtained the time domain repeated-transmission parameter, the terminal device may distinguish between the SDM mode and the FDM mode based on the DMRS indication information used to indicate one or more DMRS port identifiers in Embodiment 2.

Manner 2: The time domain repeated-transmission parameter may be pdsch-AggregationFactor, indicating that transmission is performed on pdsch-AggregationFactor consecutive slots. For example, if pdsch-AggregationFactor is 4, repeated transmission is performed in four consecutive slots. When the terminal device determines that a current transmission scenario is a multi-station transmission scenario, and the terminal device has obtained the time domain repeated-transmission parameter, the terminal device may determine that the transmission mode is a second TDM mode, that is, a TDM mode between slot units. If the terminal device has not obtained the time domain repeated-transmission parameter, the terminal device may determine that the transmission mode is one or more of a first TDM mode, an SDM mode, or an FDM mode. When the terminal device has not obtained the time domain repeated-transmission parameter, the terminal device may distinguish between the first TDM mode, the SDM mode, and the FDM mode based on the DMRS indication information used to indicate one or more DMRS port identifiers and a quantity of CDM groups without data in Embodiment 3.

For Manner 1, after determining that the transmission mode is the TDM mode, the terminal device may further determine whether the TDM mode is the first TDM mode or the second TDM mode.

In an embodiment, if the time domain repeated-transmission parameter is the first time domain repeated-transmission parameter, it may be determined that the time division multiplexing mode is the first time division multiplexing mode; or if the time domain repeated-transmission parameter is the second time domain repeated-transmission parameter, it may be determined that the time division multiplexing mode is the second time division multiplexing mode. For example, the first time domain repeated-transmission parameter may be represented as MiniSlotAggregationFactor, and the second time domain repeated-transmission parameter may be represented as SlotAggregationFactor.

In an embodiment, for the first TDM mode, the time domain repeated-transmission parameter may include a specific parameter of the first TDM mode, and further, it is determined that the transmission mode is the first TDM mode. For example, if the time domain repeated-transmission parameter includes offset information, it may be determined that the transmission mode is the first TDM mode; or if the time domain repeated-transmission parameter does not include offset information, it may be determined that the transmission mode is the second TDM mode. The offset information may indicate offset information of time domain locations of a plurality of PDSCHs.

In an embodiment, the time domain repeated-transmission parameter represents a quantity of transmission repetitions, but does not indicate whether the quantity of transmission repetitions is a quantity of transmission repetitions within a slot or a quantity of transmission repetitions between slots. This may be determined by the terminal device based on other information. For example, the other information is a feature bit in RRC signaling carrying the repeated-transmission indication information. For example, if the bit is set to "0", indicating that the quantity of transmission repetitions is a quantity of transmission repetitions within a slot, the terminal device may determine that the transmission mode is the first TDM mode; or if the bit is set to "1", indicating that the quantity of transmission repetitions is a quantity of transmission repetitions between slots, the terminal device may further that the transmission mode is the second TDM mode. For another example, if the bit is set to "0", indicating that the quantity of transmission repetitions is a quantity of transmission repetitions between slots, the terminal device may determine that the transmission mode is the second TDM mode; or if the bit is set to "1", indicating that the quantity of transmission repetitions is a quantity of transmission repetitions within a slot, the terminal device may determine that the transmission mode is the first TDM mode. For example, the other information is additional RRC signaling {mini-slot, slot}, and the additional RRC signaling is another piece of RRC signaling, which is different from the RRC signaling carrying the repeated-transmission indication information. The additional RRC signaling {mini-slot, slot} indicates whether the quantity of transmission repetitions is a quantity of transmission repetitions within a slot or a quantity of transmission repetitions between slots. For example, if {1, 0} indicates that the quantity of transmission repetitions is a quantity of transmission repetitions within a slot, the terminal device may determine that the transmission mode is the first TDM mode; or if {0, 1} indicates that the quantity of transmission repetitions is a quantity of transmission repetitions between slots, the terminal device may determine that the transmission mode is the second TDM mode. For another example, if {1, 0} indicates that the quantity of transmission repetitions is a quantity of transmission repetitions between slots, the terminal device may determine that the transmission mode is the second TDM mode; or if {0, 1} indicates that the quantity of transmission repetitions is a quantity of transmission repetitions within a slot, the terminal device may determine that the transmission mode is the first TDM mode. For a case in which the repeated-transmission indication information is used to indicate the first time domain repeated-transmission parameter and the second time domain repeated-transmission parameter:

When the terminal device determines that the current transmission scenario is a multi-station transmission scenario, if the terminal device has not obtained the first time domain repeated-transmission parameter and the second time domain repeated-transmission parameter, that is, the network device has not configured the first time domain repeated-transmission parameter and the second time domain repeated-transmission parameter for the terminal device, the terminal device may determine that the transmission mode is the SDM mode, the FDM mode, or an integrated mode of the SDM mode and the FDM mode. If the terminal device has obtained the first time domain repeated-transmission parameter and the second time domain repeated-transmission parameter, but a value of the first time domain repeated-transmission parameter and a value of the second time domain repeated-transmission parameter are both a first preset value, the terminal device may determine that the transmission mode is the SDM mode, the FDM mode, or an integrated mode of the SDM mode and the FDM mode. If the terminal device has obtained the first time domain repeated-transmission parameter and the second time domain repeated-transmission parameter, and one or both of a value of the first time domain repeated-transmission parameter and a value of the second time domain repeated-transmission parameter are greater than a first preset value, the terminal device may determine that the transmission mode is the TDM mode.

After determining that the transmission mode is the TDM mode, the terminal device may further determine whether the TDM mode is the first TDM mode or the second TDM mode. If the value of the first time domain repeated-transmission parameter is the first preset value and the value of the second time domain repeated-transmission parameter is greater than the first preset value, it may be determined that the time division multiplexing mode is the second TDM mode; if the value of the second time domain repeated-transmission parameter is the first preset value and the value of the first time domain repeated-transmission parameter is greater than the first preset value, it is determined that the time division multiplexing mode is the first TDM mode; or if the values of both the first time domain repeated-transmission parameter and the second time domain repeated-transmission parameter are greater than the first preset value, it is determined that the time division multiplexing mode is an integrated mode of the first TDM mode and the second TDM mode. The first preset value may be 1.

The case in which the repeated-transmission indication information is used to indicate the first time domain repeated-transmission parameter and the second time domain repeated-transmission parameter may be represented by using the following Table 2. In Table 2, an example in which the first preset value is 1, the first time domain repeated-transmission parameter is represented by MiniSlotAggregationFactor, and the second time domain repeated-transmission parameter is represented by SlotAggregationFactor is used.

TABLE 2

| MiniSlot-AggregationFactor | Slot-AggregationFactor | Transmission mode |
|---|---|---|
| Not configured | Not configured | SDM mode or FDM mode |
| =1 | =1 | SDM mode or FDM mode |
| >1 | =1 | First TDM mode |
| =1 | >1 | Second TDM mode |
| >1 | >1 | First TDM mode + second TDM mode |

"Not configured" in Table 2 indicates that the network device has not configured the first time domain repeated-transmission parameter and the second time domain repeated-transmission parameter for the terminal device, and the terminal device has not obtained the first time domain repeated-transmission parameter and the second time domain repeated-transmission parameter. A specific value of ">1" in Table 2 may indicate a quantity of repetitions. For example, if MiniSlotAggregationFactor is 4, it indicates that repeated transmission is performed four times in one slot. For another example, if SlotAggregationFactor is 4, it indicates that repeated transmission is performed in four consecutive slots.

Optionally, the first time domain repeated-transmission parameter and the second time domain repeated-transmission parameter may be represented as {x, y}. For example, x represents the first time domain repeated-transmission parameter, that is, a quantity of transmission repetitions within a slot; and y represents the second time domain repeated-transmission parameter, that is, repeated transmission performed in y consecutive slots. If x>1 and y=1, the terminal device may determine that the transmission mode is the first TDM transmission mode; or if x=1 and y>1, the terminal device may determine that the transmission mode is the second TDM transmission mode.

For a case in which the repeated-transmission indication information is used to indicate the frequency domain repeated-transmission parameter, the first time domain repeated-transmission parameter, and the second time domain repeated-transmission parameter:

The repeated-transmission indication information may be represented by {a, b, c}. For example, a represents the frequency domain repeated-transmission parameter, that is, a quantity of transmission repetitions in frequency domain; b represents the first time domain repeated-transmission parameter, that is, a quantity of transmission repetitions within a slot in time domain; and c represents the second time domain repeated-transmission parameter, that is, a quantity of transmission repetitions between slots in time domain. If repeated transmission does not exist in time domain or frequency domain, values of a, b, and c each may be 0 or 1. In this embodiment of this application, 1 is used as an example.

When the terminal device determines that the current transmission scenario is a multi-station transmission scenario, if the repeated-transmission indication information is {x, 1, 1}, where x is an integer greater than 1, for example, x=2, the terminal device may determine that the transmission mode is the second FDM mode. For example, if the repeated-transmission indication information is {1, 1, x}, the terminal device may determine that the transmission mode is the second TDM mode. For example, if the repeated-transmission indication information is {1, x, 1}, the terminal device may determine that the transmission mode is the first TDM mode.

During implementation of Embodiment 1 provided in this application, the terminal device determines, based on the obtained repeated-transmission indication information, that the transmission mode is the TDM mode, and no additional indication information is required for indication.

In Embodiment 2, configuration indication information is DMRS indication information, and the DMRS indication information may be used to indicate one or more DMRS port identifiers.

When a terminal device determines that a current transmission scenario is a multi-station transmission scenario, the terminal device has obtained the DMRS indication information, determines the one or more DMRS port identifiers based on the DMRS indication information, that is, may search a DMRS table for the one or more DMRS port identifiers based on an indicated value, and determines a transmission mode based on the one or more DMRS port identifiers. In this case, the terminal device determines, based on the one or more DMRS port identifiers, whether the transmission mode is an FDM mode or an SDM mode.

The terminal device may determine the transmission mode based on the one or more DMRS port identifiers in the following four manners.

Manner 1: If a quantity of CDM groups corresponding to the one or more DMRS port identifiers is a second preset value, the terminal device may determine that the transmission mode is the FDM mode. If a quantity of CDM groups corresponding to the one or more DMRS port identifiers is a third preset value, the terminal device may determine that the transmission mode is the SDM mode. The second preset value may be 1, representing one CDM group. The third preset value may be 2, representing two CDM groups. For example, in Table 1, when the value is 9, the DMRS port identifiers are [0, 1, 2] and correspond to two CDM groups, namely, the CDM group {0} and the CDM group {1}. In this case, the terminal device may determine that the transmission mode is the SDM mode. Similarly, when the value is 10 or 11, the terminal device may determine that the transmission mode is the SDM mode. For another example, in Table 1, when the value is 7, the DMRS port identifiers are [0, 1] and correspond to one CDM group, namely, the CDM group {0}. In this case, the terminal device may determine that the transmission mode is the FDM mode.

Manner 2: If the one or more DMRS port identifiers belong to a same CDM group, the terminal device may determine that the transmission mode is the FDM mode; or if the one or more DMRS port identifiers do not belong to a same CDM group, the terminal device may determine that the transmission mode is the SDM mode. For example, in Table 1, when the value is 7, the DMRS port identifiers are [0, 1] and belong to a same CDM group, namely, the CDM group {0}. In this case, the terminal device may determine that the transmission mode is the FDM mode. For another example, in Table 1, when the value is 9, the DMRS port identifiers are [0, 1, 2] and belong to two CDM groups. In this case, the terminal device may determine that the transmission mode is the SDM mode.

Manner 3: If a quantity of the one or more DMRS port identifiers is a second preset value, the terminal device may determine that the transmission mode is the FDM mode; or if a quantity of the one or more DMRS port identifiers is not a second preset value, the terminal device may determine that the transmission mode is the SDM mode. The second preset value may be 1. For example, in Table 1, when the value is 4, there is one DMRS port identifier. In this case, the terminal device may determine that the transmission mode is the FDM mode. For another example, in Table 1, when the value is 9, there are three DMRS port identifiers. In this case, the terminal device may determine that the transmission mode is the SDM mode.

Manner 4: If the one or more DMRS port identifiers are preset identifiers, the terminal device may determine that the transmission mode is the FDM mode; or if the one or more DMRS port identifiers are not preset identifiers, the terminal device may determine that the transmission mode is the SDM mode. The preset identifier may be [0], [1], or [0, 1]. For example, in Table 1, when the value is 1, 2, or 7, the DMRS port identifiers are preset identifiers. In this case, the terminal device may determine that the transmission mode is the FDM mode. For another example, in Table 1, when the value is 9, 10, or 11, the DMRS port identifiers further includes another identifier in addition to the preset identifiers. In this case, the terminal device may determine that the transmission mode is the SDM mode.

The foregoing four manners of determining the transmission mode based on the one or more DMRS port identifiers are used as examples, and do not constitute a limitation on the embodiments of this application.

In an embodiment, the terminal device determines a quantity of CDM groups based on the DMRS indication information, and determines the transmission mode based on the quantity of CDM groups. If the quantity of CDM groups is a second preset value (for example, there is one CDM group), the terminal device may determine that the transmission mode is the FDM mode; or if the quantity of CDM groups is a third preset value (for example, there are two CDM groups), the terminal device may determine that the transmission mode is the SDM mode. A difference between this manner and the foregoing Manner 1 lies in that, in the foregoing Manner 1, the one or more DMRS port identifiers are determined based on the value, and the quantity of CDM groups is determined based on the port identifier, but in this manner, the quantity of CDM groups is directly determined based on the value.

After determining that the transmission mode is the FDM mode, the terminal device may further determine whether the FDM mode is the first FDM mode or the second FDM mode. The terminal device obtains a frequency domain repeated-transmission parameter. If the terminal device has obtained the frequency domain repeated-transmission parameter, the terminal device may determine that the transmission mode is the second FDM mode; or if the terminal device has not obtained the frequency domain repeated-transmission parameter, the terminal device may determine that the transmission mode is the first FDM mode. The frequency domain repeated-transmission parameter and a time domain repeated-transmission parameter may be carried in RRC signaling together. In other words, repeated-transmission indication information carried in the RRC signaling may indicate the time domain repeated-transmission parameter and the frequency domain repeated-transmission parameter; or repeated-transmission indication information carried in the RRC signaling indicates the time domain repeated-transmission parameter, and other information in the RRC signaling indicates the frequency domain repeated-transmission parameter. The frequency domain repeated-transmission parameter may alternatively be indicated by using additional RRC signaling. For example, RRC signaling 1 indicates the time domain repeated-transmission parameter, and RRC signaling 2 indicates the frequency domain repeated-transmission parameter.

It may be understood that, in Embodiment 2, when the DMRS is used to indicate the one or more DMRS port identifiers, the terminal device determines the transmission mode based on the third column in Table 1.

In Embodiment 3, configuration indication information is DMRS indication information, and the DMRS indication information is used to indicate one or more DMRS port identifiers and a quantity of CDM groups without data.

The terminal device determines, based on the quantity of CDM groups corresponding to the one or more DMRS port identifiers and the quantity of CDM groups without data, that a transmission mode is a space division multiplexing mode, a frequency division multiplexing mode, or a first time division multiplexing mode. If the terminal device determines that the transmission mode is the frequency division multiplexing mode, the terminal device determines, based on a group identifier of a CDM group corresponding to the one or more DMRS port identifiers, that the transmission mode is a first frequency division multiplexing mode or a second frequency division multiplexing mode.

For example, if there are two CDM groups corresponding to the one or more DMRS port identifiers, the terminal device may determine that the transmission mode is the SDM mode; or if there is one CDM group corresponding to the one or more DMRS port identifiers, and there is one CDM group without data, the terminal device may determine that the transmission mode is a first TDM mode; or if there is one CDM group corresponding to the one or more DMRS port identifiers, and there are two CDM groups without data, the terminal device may determine that the transmission mode is the FDM mode. After it is determined that the transmission mode is the FDM mode, if a group identifier of a CDM group corresponding to the one or more DMRS port identifiers is a first identifier, the terminal device may determine that the transmission mode is a first FDM mode; or if a group identifier of a CDM group corresponding to the one or more DMRS port identifiers is a second identifier, the terminal device may determine that the transmission mode is a second FDM mode. For example, if the group identifier of the CDM group is {0}, the terminal device determines that the transmission mode is the first FDM mode; or if the group identifier of the CDM group is {1}, the terminal device determines that the transmission mode is the second FDM mode. For another example, if the group identifier of the CDM group is {1}, the terminal device determines that the transmission mode is the first FDM mode; or if the group identifier of the CDM group is {0}, the terminal device determines that the transmission mode is the second FDM mode.

Based on the foregoing examples, the transmission mode corresponding to each value in Table 1 may be determined. For details, refer to the following Table 3.

TABLE 3

| Value | Quantity of CDM groups without data | DMRS port | Transmission mode |
|---|---|---|---|
| 0 | 1 | 0 | First TDM mode |
| 1 | 1 | 1 | First TDM mode |
| 2 | 1 | 0, 1 | First TDM mode |
| 3 | 2 | 0 | First FDM mode |
| 4 | 2 | 1 | First FDM mode |
| 5 | 2 | 2 | Second FDM mode |
| 6 | 2 | 3 | Second FDM mode |
| 7 | 2 | 0, 1 | First FDM mode |
| 8 | 2 | 2, 3 | Second FDM mode |
| 9 | 2 | 0-2 | SDM mode |
| 10 | 2 | 0-3 | SDM mode |
| 11 | 2 | 0, 2 | SDM mode |
| 12-15 | Reserved | Reserved | |

In Table 3, if the group identifier of the CDM group is {0}, the corresponding transmission mode is the first FDM mode; or if the group identifier of the CDM group is {1}, the corresponding transmission mode is the second FDM mode. In Table 3, each transmission mode has a corresponding DMRS table entry. For example, the first TDM mode, the first FDM mode, the second FDM mode, and the SDM mode may be distinguished by using four entries {2, 7, 8, 11}.

Based on Table 3, if a transmission mode used by a network device is the SDM mode, the network device may configure an index of a DMRS table whose DMRS type=1 and that has one symbol, as one of 9, 10, or 11, that is, the DMRS indication information is used to indicate the value 9 in Table 3, to implicitly notify the terminal device that the current transmission mode is the SDM mode. For another example, if the transmission mode used by the network device is the first FDM mode, the network device may configure the index of the DMRS table as one of {3, 4, 7}, to implicitly notify the terminal device that the current transmission mode is the first FDM mode.

It may be understood that, in Embodiment 3, when the DMRS is used to indicate the one or more DMRS port identifiers and the quantity of CDM groups without data, the terminal device determines the transmission mode based on the second column and the third column in Table 1.

During implementation of Embodiment 2 and Embodiment 3 that are provided in this application, the terminal device distinguishes between the SDM mode and the FDM mode based on the obtained DMRS indication information, and no additional indication information is required for indication.

Embodiment 3-1

In Embodiment 3-1, a combination of one or more of one or more DMRS port identifiers, a group identifier of a CDM group, a quantity of CDM groups, a group identifier of a CDM group without data, or a quantity of CDM groups without data is used to distinguish between different transmission modes. The group identifier of the CDM group in this specification may indicate a CDM group with data, and is distinguished from a CDM group without data. As described above, transmission modes are classified into a space division multiplexing mode, a frequency division multiplexing mode, a time division multiplexing mode, and the like, which are referred to as different transmission modes in this specification. In addition, each transmission mode may further be divided into sub-modes. For example, the frequency division multiplexing mode may be classified into a first frequency division multiplexing mode and a second frequency division multiplexing mode, and the time division multiplexing mode may be classified into a first time division multiplexing mode and a second time division multiplexing mode, which are referred to as different sub-modes of a same transmission mode in this specification.

Different transmission modes or different sub-modes of a same transmission mode may be distinguished in this embodiment according to one of the following rules or a combination of more than two rules:

(1) Different DMRS port identifiers correspond to different transmission modes or correspond to different sub-modes of a same transmission mode.

(2) Different group identifiers of CDM groups correspond to different transmission modes or correspond to different sub-modes of a same transmission mode. The group identifier of the CDM group may be directly indicated, or may be indirectly obtained by using DMRS port identifiers belonging to different CDM groups.

(3) Different quantities of CDM groups correspond to different transmission modes or correspond to different sub-modes of a same transmission mode. The quantity of CDM groups may be directly indicated, or may be indirectly obtained by using DMRS port identifiers belonging to different CDM groups.

(4) Different quantities of CDM groups without data correspond to different transmission modes or correspond to different sub-modes of a same transmission mode.

(5) Different identifiers of CDM groups without data correspond to different transmission modes or correspond to different sub-modes of a same transmission mode.

A combination of the foregoing rules may be:

(6) Different combinations of the CDM group identifier and the quantity of CDM groups without data correspond to different transmission modes or correspond to different sub-modes of a same transmission mode.

(7) Different combinations of the CDM group identifier and the group identifier of the CDM group without data correspond to different transmission modes or correspond to different sub-modes of a same transmission mode.

(8) Different combinations of the quantity of CDM groups and the quantity of CDM groups without data correspond to different transmission modes or correspond to different sub-modes of a same transmission mode.

(9) Different combinations of the quantity of CDM groups and the identifier of the CDM group without data correspond to different transmission modes or correspond to different sub-modes of a same transmission mode.

(10) Different combinations of the quantity of CDM groups and the one or more DMRS port identifiers correspond to different transmission modes or correspond to different sub-modes of a same transmission mode.

(11) Different combinations of the identifier of the CDM group and the one or more DMRS port identifiers correspond to different transmission modes or correspond to different sub-modes of a same transmission mode.

(12) Different combinations of the quantity of CDM groups and the identifier of the CDM group correspond to different transmission modes or correspond to different sub-modes of a same transmission mode.

(13) Different combinations of the group identifier of the CDM group and the group identifier of the CDM group without data correspond to different transmission modes or correspond to different sub-modes of a same transmission mode.

(14) Different combinations of the group identifier of the CDM group and the quantity of CDM groups without data correspond to different transmission modes or correspond to different sub-modes of a same transmission mode.

The foregoing combinations are merely examples. There may be another combination that may be used to distinguish between different transmission modes or different sub-modes corresponding to a same transmission mode. The one or more DMRS port identifiers, the group identifier of the CDM group, the quantity of CDM groups, the identifier of the CDM group without data, and the quantity of CDM groups without data may be directly or indirectly indicated by using the DMRS indication information. In other words, provided that an indication can be given, the one or more DMRS port identifiers, the group identifier of the CDM group, the quantity of CDM groups, the identifier of the CDM group without data, and the quantity of CDM groups without data may be referred to as the DMRS indication information. Direct indication is that a parameter is directly indicated by using the DMRS indication information. Indirect indication is that a parameter may be obtained by using another parameter. For example, the DMRS indication information indicates the one or more DMRS port identifiers, and the group identifier of the CDM group or the quantity of CDM groups may be obtained based on the one or more DMRS port identifiers.

In an implementation, the DMRS indication information is indicated by using a DMRS table entry. The DMRS table entry herein may also be referred to as an index or a value of the DMRS table.

Therefore, in this embodiment, that the DMRS indication information corresponds to different values, different transmission modes, or different sub-modes of a same transmission mode may further be used. Alternatively, a combination of one or more of different values corresponding to the DMRS indication information, the one or more DMRS port identifiers, the group identifier of the CDM group, the quantity of CDM groups, the identifier of the CDM group without data, or the quantity of CDM groups without data may correspond to different transmission modes or correspond to different sub-mode of a same transmission mode.

Some reserved values in the values corresponding to the DMRS indication information usually are not used to indicate a corresponding DMRS port identifier, a group identifier of a CDM group, a quantity of CDM groups, an identifier of a CDM group without data, and a quantity of CDM groups without data, but may be used in the future. The reserved values that are not used at the current stage but may be used in the future and some values that may be added in the future and that are used to indicate the DMRS configuration information are referred to as predefined values in this embodiment.

The terminal device determines, based on one or more of the one or more DMRS port identifiers, the group identifier of the CDM group, the quantity of CDM groups, the quantity of CDM groups corresponding to the one or more DMRS port identifiers, the identifier of the CDM group corresponding to the one or more DMRS port identifiers, and the quantity of CDM groups without data, that the transmission mode is one or more of the space division multiplexing mode, the first frequency division multiplexing mode, the second frequency division multiplexing mode, the first time division multiplexing mode, or the second time division multiplexing mode, where the one or more DMRS port identifiers, the group identifier of the CDM group, the quantity of CDM groups, the quantity of CDM groups corresponding to the one or more DMRS port identifiers, the identifier of the CDM group corresponding to the one or more DMRS port identifiers, and the quantity of CDM groups without data are indicated by the DMRS indication information.

With reference to the implementations herein, the following describes how to distinguish between different transmission modes or how to distinguish between different sub-modes of a same transmission mode according to the rules (1) to (5) in the foregoing examples. It should be noted that not all possible implementations are enumerated in this embodiment, and a person skilled in the art may obtain an equivalent implementation according to the rules and the enumerated implementations described in this specification.

For the rule (3), different quantities of CDM groups, or different quantities of CDM groups corresponding to one or more DMRS port identifiers correspond to different transmission modes.

If there are two CDM groups corresponding to the one or more DMRS port identifiers, a corresponding transmission mode is the SDM mode by default. For example, in Table 3-1, DMRS port identifiers corresponding to values 9, 10, and 11 are respectively [0-2], [0-3], and [0, 2]. As described above, the DMRS port [0] and the DMRS port [1] belong to the CDM group {0}, the DMRS port [2] and the DMRS port [3] belong to the CDM group {1}, and the three groups of DMRS port identifiers belong to the CDM group {0} and the CDM group {1}, that is, correspond to two CDM groups. The network device may send the DMRS indication information to the terminal device based on a correspondence between the quantity 2 of CDM groups and the transmission mode being the SDM mode, that is, one or more of values 9, 10, and 11, to indicate the SDM mode to the terminal device. After receiving one or more of values 9, 10, and 11, the terminal device may determine that the current transmission mode is the SDM mode.

Herein, that the quantity of CDM groups being 2 corresponds to the SDM mode is merely used as an example. That the quantity of CDM groups being 2 may alternatively indicate another transmission mode, for example, an eMBB mode. Therefore, for values (the values 9, 10, and 11 in Table 3-1) corresponding to the SDM mode/eMBB mode, because the two transmission modes have a same physical procedure, the network device may configure a value in the DMRS configuration information table as one of {9, 10, 11}, to implicitly notify the terminal device that the current transmission mode is a multi-station uRLLC SDM transmission mode or a multi-station eMBB transmission mode.

If the one or more DMRS port identifiers correspond to one CDM group, the default corresponding transmission mode is a mode other than the SDM mode. Any one or a combination of the rule (8), the rule (9), the rule (10), and the rule (12) may be used to distinguish between different transmission modes or different sub-modes of a same transmission mode. An example is provided below:

There is one CDM group, and the first frequency division multiplexing mode, the second frequency division multiplexing mode, the first time division multiplexing mode, and the second time division multiplexing mode may be distinguished between each other based on a combination of one or more of the following parameters: the one or more DMRS port identifiers, the group identifier of the CDM group corresponding to the one or more DMRS port identifiers, and the quantity of CDM groups without data. It should be noted that, in this case, the foregoing four transmission modes are basically the same. If N different parameter combinations exist, the foregoing four transmission modes may correspond to any one of the parameter combinations. This is not limited in this application.

For example, when there is one CDM group, the first frequency division multiplexing mode, the second frequency division multiplexing mode, the first time division multiplexing mode, and the second time division multiplexing mode are distinguished between each other based on a combination of a group identifier of the CDM group and the quantity of CDM groups without data. For Table 1, that is, the DMRS table whose DMRS type=1 and that has one symbol in the current Release 15, there are two values {1, 2} of the quantity of CDM groups without data, and there are two values {0, 1} of the group identifier of the CDM group corresponding to the one or more DMRS port identifiers, that is, the DMRS port [0] and the DMRS port [1] belong to the CDM group {0}, and the DMRS port [2] and the DMRS port [3] belong to the CDM group {1}. In Table 1, there are three combinations [1 0], [2 0], and [2 1] in total between the quantity of CDM groups without data and the group identifier of the CDM group to which the one or more DMRS port identifiers belong. In this case, it is equivalent to that the four transmission modes may correspond to any one of the three combinations. The remaining transmission mode needs to be identified by using an additional parameter or a predefined value (for example, a reserved value or a value that may be added).

Based on the foregoing examples, the transmission mode corresponding to each value in Table 1 may be determined. For details, refer to the following Table 3-1. For Table 1, there are $C^3_4 A^3_3 = 24$ allocation cases of the foregoing four transmission modes. The following table lists only four cases as examples.

TABLE 3-1

| Value | Quantity of CDM groups without data | DMRS port | Transmission mode scenario 1 | Transmission mode scenario 2 |
|---|---|---|---|---|
| 0 | 1 | 0 | First/Second TDM mode | First/Second FDM mode |
| 1 | 1 | 1 | First/Second TDM mode | First/Second FDM mode |
| 2 | 1 | 0, 1 | First/Second TDM mode | First/Second FDM mode |
| 3 | 2 | 0 | First FDM mode | First TDM mode |
| 4 | 2 | 1 | First FDM mode | First TDM mode |
| 5 | 2 | 2 | Second FDM mode | Second TDM mode |
| 6 | 2 | 3 | Second FDM mode | Second TDM mode |
| 7 | 2 | 0, 1 | First FDM mode | First TDM mode |
| 8 | 2 | 2, 3 | Second FDM mode | Second TDM mode |
| 9 | 2 | 0-2 | SDM mode/eMBB | SDM mode/eMBB |
| 10 | 2 | 0-3 | SDM mode/eMBB | SDM mode/eMBB |
| 11 | 2 | 0, 2 | SDM mode/eMBB | SDM mode/eMBB |
| 12-15 | Reserved | Reserved | (Optional) | (Optional) |

TABLE 3-1-continued

| Value | Quantity of CDM groups without data | DMRS port | Transmission mode scenario 3 | Transmission mode scenario 4 |
|---|---|---|---|---|
| 0 | 1 | 0 | First FDM mode | |
| 1 | 1 | 1 | First FDM mode | |
| 2 | 1 | 0, 1 | First FDM mode | |
| 3 | 2 | 0 | Second FDM mode | First/Second FDM mode |
| 4 | 2 | 1 | Second FDM mode | First/Second FDM mode |
| 5 | 2 | 2 | First/Second TDM mode | First/Second TDM mode |
| 6 | 2 | 3 | First/Second TDM mode | First/Second TDM mode |
| 7 | 2 | 0, 1 | Second FDM mode | First/Second FDM mode |
| 8 | 2 | 2, 3 | First/Second TDM mode | First/Second TDM mode |
| 9 | 2 | 0-2 | SDM mode/eMBB | SDM mode/eMBB |
| 10 | 2 | 0-3 | SDM mode/eMBB | SDM mode/eMBB |
| 11 | 2 | 0, 2 | SDM mode/eMBB | SDM mode/eMBB |
| 12-15 | Reserved | Reserved | (Optional) | (Optional) |

The following describes the content of Table 3-1.

1. One or more same transmission modes may correspond to different values in a DMRS table. One transmission mode corresponds to different values in a DMRS table (for example, values in the transmission mode scenario 1 are 3, 4, and 7). In other words, different values in a DMRS table may correspond to a same transmission mode. In this case, the network device may indicate, to the terminal device, that the value of the DMRS table whose DMRS type=1 and that has one symbol is at least one of {3, 4, 7}, for example, indicate the value 3, the value 4, or the value 7 in Table 3-1, or indicate the value 3 and the value 4, indicate the value 4 and the value 7, or indicate the value 3 and the value 7, or indicate the value 3, the value 4, and the value 7, to implicitly notify the terminal device that a current transmission mode is the first FDM mode. This application does not limit that the foregoing entries all indicate the transmission modes shown in Table 3-1, and the foregoing values are reserved for another transmission mode, for example, a single-station transmission mode.

2. For a case in which a plurality of pieces of DMRS indication information correspond to a plurality of same transmission modes, for example, values {0, 1, 2} in the transmission mode scenario 1, because a quantity of values in the DMRS table is limited, the foregoing values correspond to the first TDM mode or the second TDM mode. In this case, the transmission mode may be further identified in the following manners:

(1) An additional DMRS parameter is introduced. In this embodiment, different DMRS port identifiers may be used to further distinguish between the values. For example, the $1^{st}$ DMRS port identifier corresponds to the first TDM mode, and the $2^{nd}$ DMRS port identifier corresponds to the second TDM mode, that is, the value 0 corresponds to the first TDM mode, and the value 1 corresponds to the second TDM mode. In this way, the network device sends the DMRS indication information, that is, a corresponding value, to the terminal device, so that the terminal device can distinguish between the first TDM mode and the second TDM mode based on the received value. For the transmission mode scenario 2, the value 0, the value 1, and the value 2 correspond to the first FDM mode or the second FDM mode. The first FDM mode and the second FDM mode may also be distinguished by using different DMRS port identifiers. A principle thereof is the same as that for distinguishing between the first TDM mode and the second TDM mode, and details are not described herein again.

(2) Another parameter or other signaling is used for distinguishing. First, RRC signaling may be used to distinguish between different sub-modes of a same transmission mode that need to be distinguished in the foregoing scenario, for example, the first TDM mode and the second TDM mode, or the first FDM mode and the second FDM mode. For example, the RRC signaling may be TransmissionScheme ENUMERATED {2a, 2b} or TransmissionScheme ENUMERATED {3, 4}. Second, distinguishing may alternatively be performed based on whether a particular parameter of a transmission mode is configured or whether a particular action of a transmission mode is performed. For example, for the first TDM mode and the second TDM mode, if the RRC signaling is configured to represent a quantity of repetitions in time domain (which is similar to pdsch-AggregationFactor in Rel-15), the current transmission mode is the second TDM mode in a multi-station case; if an additional parameter is configured in RRC IE (information element) pdsch-TimeDomainAllocationList, for example, a plurality of startSymbolAndLengths, or an additional RRC parameter RepetitionTimes is added, the current transmission mode is the first TDM mode. Similarly, for the first FDM mode and the second FDM mode, if a plurality of RVs are configured, or a soft combination related action is performed on a terminal device side, or a soft combination capability is reported, the current transmission mode is the second FDM mode; otherwise, the current transmission mode is the first FDM mode. Other distinguishing methods are also described in other embodiments of this application, and details are not described herein again.

(3) A predefined value of the DMRS indication information is used to correspondingly distinguish between transmission modes. For example, a reserved value or a newly added value is used, or even a used value that has been used to indicate DMRS configuration information but has not been used to indicate a transmission mode is used to distinguish between remaining transmission modes. For example, in the transmission mode scenario 1, one or more reserved values may be used to indicate the first or second TDM mode, so that a DMRS table may be used to distinguish between all multi-station eMBB transmission modes and all multi-station uRLLC transmission modes.

Table 3-1 shows four typical scenarios in which the foregoing indication method is used. The network device distinguishes between the FDM transmission mode and the TDM transmission mode based on the quantity of CDM groups without data. The quantity {1} and the quantity {2} respectively correspond to the FDM mode and the TDM mode. For example, the quantity {1} corresponds to the TDM mode and the quantity {2} corresponds to the FDM mode. This is denoted as the transmission mode scenario 1. For another example, the quantity {1} corresponds to the FDM mode, and the quantity {2} corresponds to the TDM mode. This is recorded as the transmission mode scenario 2. In addition, the first FDM mode and the second FDM mode are distinguished by using the group identifier of the CDM group corresponding to the one or more DMRS port identifiers. For example, if DMRS ports corresponding to values 3, 4, 5, 6, 7, and 8 are respectively [0], [1], [2], [3], [0, 1], and [2, 3], that is, group identifiers of corresponding CDM groups are respectively {0}, {0}, {1}, {1}, {0}, and {1}, the corresponding FDM modes are respectively the first FDM mode, the first FDM mode, the second FDM mode, the second FDM mode, the first FDM mode, and the second FDM mode. In other words, values 3, 4, 5, 6, 7, and 8 respectively correspond to the first FDM mode, the first FDM mode, the second FDM mode, the second FDM mode, the first FDM mode, and the second FDM mode. Based on this, the network device indicates different values to the terminal device, and the terminal device can distinguish between the first FDM mode and the second FDM mode based on the values. For the scenario 2, the values 3, 4, 5, 6, 7, and 8 respectively correspond to the first TDM mode, the first TDM mode, the second TDM mode, the second TDM mode, the first TDM mode, and the second TDM mode. The network device indicates different values to the terminal device to indicate the first TDM mode or the second TDM mode. This is similar to the foregoing cases, and details are not described again.

For the case in which the value 0, the value 1, or the value 2 corresponds to the first TDM mode or the second TDM mode (scenario 1) and the quantity of CDM groups without data is 1, the first TDM mode and the second TDM mode may be distinguished in the three manners in the description 2 of Table 3-1. In the scenario 2, the first FDM mode or the second FDM mode corresponding to the value 0, the value 1, or the value 2 is similar to the first FDM mode or the second FDM mode in the foregoing case, and details are not described herein again.

As shown in Table 3-1 (continued), for the scenario 3, the group identifier of the CDM group corresponding to the one or more DMRS port identifiers is used to distinguish between the FDM mode and the TDM mode. That is, the CDM group {0} corresponds to the FDM mode, and the CDM group {1} corresponds to the TDM mode; or the CDM group {0} corresponds to the TDM mode, and the CDM group {1} corresponds to the FDM mode. In the scenario 3, the first FDM mode and the second FDM mode, or the first TDM mode and the second TDM mode are distinguished by using quantities of CDM groups without data. For example, the five cases in which DMRS ports respectively corresponding to values 0, 1, 2, 3, and 4 are [0], [1], [0, 1], [0], and [1] all correspond to the CDM group {0}. The CDM group {0} corresponds to the FDM mode. In addition, the quantity, corresponding to the values 0, 1, and 2, of CDM groups without data is {1}, and corresponds to the first FDM mode. The quantity, corresponding to values 3 and 4, of CDM groups without data is {2}, and corresponds to the second FDM mode. The network device sends a corresponding value to the terminal device. For example, if the value is one or more of 0, 1, and 2, the terminal device may determine that the corresponding transmission mode is the first FDM mode; or if the value is one or more of 3 or 4, the terminal device may determine that the corresponding transmission mode is the second FDM mode.

For the scenario 4, the FDM mode and the TDM mode are also distinguished by using the group identifier of the CDM group corresponding to the one or more DMRS port identifiers. That is, the CDM group {0} corresponds to the FDM mode, and the CDM group {1} corresponds to the TDM mode; or the CDM group {0} corresponds to the TDM mode, and the CDM group {1} corresponds to the FDM mode. However, the sub-modes of the FDM mode and the TDM mode may not need to be distinguished by using the quantity of CDM groups without data, that is, both the FDM mode and the TDM mode may correspond to the quantity {2} of CDM groups without data. The first FDM mode and the second FDM mode each may correspond to three values (including values 3, 4, and 7), the first TDM mode and the second TDM mode each may correspond to three values (including values 5, 6, and 8), and vice versa. In this case, the first FDM mode and the second FDM mode, or the first TDM mode and the second TDM mode may be distinguished in the three manners in the description 2 of Table 3-1. Details are not described herein again.

Alternatively, on a basis of this manner, for the value (which is the value 0, 1, or 2 in this table) corresponding to the quantity {1} of CDM groups without data, only one of the TDM mode or the FDM mode may be allocated. That is, in Table 3-1, the FDM mode may correspond to six values (including values 0, 1, and 2), and the TDM mode may correspond to three values; or the TDM mode may correspond to six values (including values 0, 1, and 2), and the FDM mode may correspond to three values. Further, in a case in which the two modes correspond to different quantities of values, a mode in which a predefined value of the DMRS indication information corresponds to a relatively small quantity of values may be used. For example, a reserved value is used, so that quantities of values corresponding to the FDM mode and the TDM mode are the same. For example, the FDM mode may correspond to six values (including values 0, 1, 2, 3, 4, and 7), and the TDM mode may also correspond to six values (including values 5, 6, 8, 12, 13, and 14); or the TDM mode may correspond to six values (including values 0, 1, 2, 3, 4, and 7), and the FDM mode may also correspond to six values (including values 5, 6, 8, 12, 13, and 14).

Similarly, the first FDM mode and the second FDM mode, or the first TDM mode and the second TDM mode may be distinguished in the three manners in the description 2 of Table 3-1. Details are not described herein again.

Similarly, when the one or more DMRS port identifiers correspond to one CDM group, the first frequency division multiplexing mode, the second frequency division multiplexing mode, the first time division multiplexing mode, and the second time division multiplexing mode may be distinguished based on the one or more DMRS port identifiers and the group identifier of the CDM group corresponding to the one or more DMRS port identifiers. In other words, for each given CDM group, different DMRS port identifiers may be used to indicate different transmission modes.

TABLE 3-2

| Value | Quantity of CDM groups without data | DMRS port | Transmission mode scenario 1 | Transmission mode scenario 2 |
|---|---|---|---|---|
| 0 | 1 | 0 | First TDM mode | First FDM mode |
| 1 | 1 | 1 | First FDM mode | Second FDM mode |
| 2 | 1 | 0, 1 | First/Second TDM mode | First/Second FDM mode |
| 3 | 2 | 0 | First TDM mode | First FDM mode |
| 4 | 2 | 1 | First FDM mode | Second FDM mode |
| 5 | 2 | 2 | Second TDM mode | First TDM mode |
| 6 | 2 | 3 | Second FDM mode | Second TDM mode |
| 7 | 2 | 0, 1 | First/Second TDM mode | First/Second FDM mode |
| 8 | 2 | 2, 3 | First/Second FDM mode | First/Second TDM mode |
| 9 | 2 | 0-2 | SDM mode/eMBB | SDM mode/eMBB |
| 10 | 2 | 0-3 | SDM mode/eMBB | SDM mode/eMBB |
| 11 | 2 | 0, 2 | SDM mode/eMBB | SDM mode/eMBB |
| 12-15 | Reserved | Reserved | (Optional) | (Optional) |

Table 3-2 shows two typical scenarios in which the foregoing indication method is used. For the scenario 1, the FDM mode and the TDM mode are distinguished by using DMRS port identifiers, such as the $1^{st}$ DMRS port identifier and the $2^{nd}$ DMRS port identifier in each CDM group respectively correspond to the TDM mode and the FDM mode. In addition, the first FDM mode and the second FDM mode, or the first TDM mode and the second TDM mode are distinguished by using group identifiers of CDM group corresponding to the DMRS port identifiers. For example, the DMRS port identifier [0] is the $1^{st}$ DMRS port identifier in the CDM group {0}, and is used to represent the first TDM mode; the DMRS port identifier [1] is the 2nd DMRS port identifier in the CDM group {0}, and is used to represent the first FDM mode; the DMRS port identifier [2] is the $1^{st}$ DMRS port identifier in the CDM group {1}, and is used to represent the second TDM mode; and the DMRS port identifier [3] is the $2^{nd}$ DMRS port identifier in the CDM group {1}, and is used to represent the second FDM mode. In this case, values 0, 1, 3, 4, 5, and 6 respectively correspond to the first TDM mode, the first FDM mode, the first TDM mode, the first FDM mode, the second TDM mode, and the second FDM mode. The network device may indicate the transmission modes of the terminal device by indicating different values to the terminal device. The terminal device may determine the transmission modes based on different received values. Herein, that the $1^{st}$ DMRS port identifier in each CDM group corresponds to the TDM mode and the $2^{nd}$ DMRS port identifier in each CDM group corresponds to the FDM mode is merely an example. Alternatively, the $1^{st}$ DMRS port identifier in each CDM group may correspond to the FDM mode and the $2^{nd}$ DMRS port identifier in each CDM group may correspond to the TDM mode.

For the scenario 2, the FDM mode and the TDM mode are distinguished by using group identifiers of CDM groups corresponding to the one or more DMRS port identifiers, such as the CDM group {0} corresponds to the FDM mode, and the CDM group {1} corresponds to the TDM mode. In addition, the first FDM mode and the second FDM mode, or the first TDM mode and the second TDM mode are distinguished by using one or more DMRS port identifiers. For example, the DMRS port identifier [0] belongs to the CDM group {0}, and is used to represent the first FDM mode; the DMRS port identifier [1] belongs to the CDM group {0}, and is used to represent the second FDM mode; the DMRS port identifier [2] belongs to the CDM group {1}, and is used to represent the first TDM mode; and the DMRS port identifier [3] belongs to the CDM group {1}, and is used to represent the second TDM mode. In this case, values 0, 1, 3, 4, 5, and 6 respectively correspond to the first FDM mode, the second FDM mode, the first FDM mode, the second FDM mode, the first TDM mode, and the second TDM mode. The network device may indicate the transmission modes of the terminal device by indicating different values to the terminal device. The terminal device may determine the transmission modes based on different received values. Herein, that the CDM group {0} corresponds to the FDM mode and the CDM group {1} corresponds to the TDM mode is merely an example. Alternatively, the CDM group {0} may correspond to the TDM mode and the CDM group {1} may correspond to the FDM mode. That the DMRS port identifier 0 represents the first FDM mode and the DMRS port identifier 1 represents the second FDM mode is merely an example. Alternatively, the DMRS port identifier 1 may represent the first FDM mode and the DMRS port identifier 0 may represent the second FDM mode. That the DMRS port identifier 2 represents the first TDM mode and the DMRS port identifier 3 represents the second TDM mode is merely an example. Alternatively, the DMRS port identifier 3 may represent the first TDM mode and the DMRS port identifier 2 may represent the second TDM mode.

It may be understood that when the DMRS port identifiers corresponding to the value 2, the value 7, and the value 8 represent two transmission modes, the three manners in the description 2 in Table 3-1 may be used for distinguishing, and details are not described herein again.

In Embodiment 3-1, the terminal device is notified, by using one or more of the one or more DMRS port identifiers, the quantity of CDM groups, the group identifier of the CDM group, the quantity of CDM groups corresponding to the one or more DMRS port identifiers, the group identifier of the CDM group corresponding to the one or more DMRS port identifiers, and the quantity of CDM groups without data, that the transmission mode is one or more of the first frequency division multiplexing mode, the second frequency division multiplexing mode, the first time division multiplexing mode, or the second time division multiplexing mode.

In addition, the rule in this embodiment is also applicable to a DMRS table other than Table 1 in the current Release 15 or a new DMRS table that may appear in a later release. A difference lies in that for a table other than Table 1, a quantity of combinations of the foregoing different parameters in this embodiment may change. However, the network device may still distinguish between the space division multiplexing mode, the first frequency division multiplexing mode, the second frequency division multiplexing mode, the first time division multiplexing mode, and the second time division multiplexing mode according to the foregoing rule.

For example, for Table 3-3, that is, the DMRS table of the type=2, 1 symbol in the current Release 15, the terminal device may still distinguish between the first frequency division multiplexing mode, the second frequency division multiplexing mode, the first time division multiplexing mode, and the second time division multiplexing mode based on the combination of the group identifier of the CDM group corresponding to the one or more DMRS port identifiers and the quantity of CDM groups without data.

TABLE 3-3

| Value | Quantity of CDM groups without data | DMRS port | Transmission mode scenario 1 | Transmission mode scenario 2 |
|---|---|---|---|---|
| 0 | 1 | 0 | | |
| 1 | 1 | 1 | | |
| 2 | 1 | 0, 1 | | |
| 3 | 2 | 0 | First FDM mode | First FDM mode |
| 4 | 2 | 1 | First FDM mode | Second FDM mode |
| 5 | 2 | 2 | Second FDM mode | First TDM mode |
| 6 | 2 | 3 | Second FDM mode | Second TDM mode |
| 7 | 2 | 0, 1 | First FDM mode | First FDM mode |
| 8 | 2 | 2, 3 | Second FDM mode | First TDM mode |
| 9 | 2 | 0-2 | SDM mode/eMBB | SDM mode/eMBB |
| 10 | 2 | 0-3 | SDM mode/eMBB | SDM mode/eMBB |
| 11 | 3 | 0 | First TDM mode | First FDM mode |
| 12 | 3 | 1 | First TDM mode | Second FDM mode |
| 13 | 3 | 2 | Second TDM mode | First TDM mode |
| 14 | 3 | 3 | Second TDM mode | Second TDM mode |
| 15 | 3 | 4 | | |
| 16 | 3 | 5 | | |
| 17 | 3 | 0, 1 | First TDM mode | Second FDM mode |
| 18 | 3 | 2, 3 | Second TDM mode | Second TDM mode |
| 19 | 3 | 4, 5 | | |
| 20 | 3 | 0-2 | SDM mode/eMBB | SDM mode/eMBB |
| 21 | 3 | 3-5 | SDM mode/eMBB | SDM mode/eMBB |
| 22 | 3 | 0-3 | SDM mode/eMBB | SDM mode/eMBB |
| 23 | 2 | 0, 2 | SDM mode/eMBB | SDM mode/eMBB |
| 24-31 | Reserved | Reserved | | |

For example, Table 3-3 provides two typical distinguished transmission mode scenarios. For the scenario 1, different quantities of CDM groups without data are used to distinguish between the FDM mode and the TDM mode, and quantities {2} and {3} respectively correspond to the FDM mode and the TDM mode. In addition, the first FDM mode and the second FDM mode, or the first TDM mode and the second TDM mode are distinguished by using group identifiers {0} and {1} of the CDM groups corresponding to the one or more DMRS port identifiers. For the scenario 2, group identifiers of CDM groups corresponding to the one or more DMRS port identifiers are used to distinguish between the FDM mode and the TDM mode. {0} and {1} respectively correspond to the FDM mode and the TDM mode. In addition, the first FDM mode and the second FDM mode, or the first TDM mode and the second TDM mode are distinguished by using the one or more DMRS port identifiers. For Table 3-3, because quantities of possible parameter combinations are more than quantities of transmission modes that need to be distinguished, the network device may distinguish between all the foregoing transmission modes by using DMRS indication information, and notify the terminal device of a current transmission mode by configuring a corresponding DMRS index.

During implementation of Embodiment 3-1 provided in this application, the DMRS indication information is used to distinguish between a multi-station SDM mode, a multi-station FDM mode, a multi-station TDM mode, and a multi-station eMBB mode. The network device may send the DMRS indication information to the terminal device to indicate information such as a quantity of corresponding CDM groups without data and a DMRS port, in other words, the transmission mode may be implicitly indicated, and no additional indication information is required for indication, so that indication overheads can be reduced.

In all the embodiments of this application, the correspondence between different values and quantities of CDM groups without data and the correspondence between DMRS ports are merely examples, and there may be another correspondence. This embodiment of this application is about how to use the quantity of CDM groups without data, the one or more DMRS port identifiers, the group identifier of the CDM group corresponding to the one or more DMRS port identifiers, or the quantity of CDM groups to correspond to different transmission modes, so that the network device indicates a transmission mode to the terminal device, or the terminal device identifies a transmission mode. A value is merely used to indicate the quantity of CDM groups without data, is an implementation of the correspondence between DMRS ports, and should not construct any limitation on the embodiments of this application.

In addition, it should be noted that there is no sequence for distinguishing between different transmission modes and distinguishing between different sub-modes of a same transmission mode. Any case in which different transmission modes or different sub-modes of a same transmission mode can be distinguished according to the foregoing rule shall fall within the scope of the embodiments of this application.

In Embodiment 4, configuration indication information is TCI information.

After a terminal device determines that a current transmission scenario is a multi-station transmission scenario, if a quantity of TCI states is a fourth preset value, the terminal device may determine that a transmission mode is an FDM mode or an SDM mode; or if a quantity of TCI states is greater than a fourth preset value, the terminal device may determine that a transmission mode is a TDM mode. The fourth preset value may be 2, representing two TCI states.

In an embodiment, after a terminal device determines that a current transmission scenario is a multi-station transmission scenario, if a quantity of TCI states is a fourth preset value, the terminal device may determine that a transmission mode is an FDM mode or an SDM mode; or if a quantity of TCI states is a fifth preset value, the terminal device may determine that a transmission mode is a TDM mode. The fourth preset value may be 2, representing two TCI states. The fifth preset value may be 4, representing four TCI states.

In Embodiment 5, configuration indication information is TCI information and repeated-transmission indication information.

In an embodiment, the repeated-transmission indication information is used to indicate a time domain repeated-transmission parameter. After a terminal device determines that a current transmission scenario is a multi-station transmission scenario, the terminal device obtains the repeated-transmission indication information, and a quantity of TCI states is greater than or equal to a fourth preset value. In this case, the terminal device may determine that a transmission mode is a TDM mode.

In an embodiment, the repeated-transmission indication information is used to indicate a first time domain repeated-transmission parameter and a second time domain repeated-transmission parameter. After a terminal device determines that a current transmission scenario is a multi-station transmission scenario, the terminal device obtains the repeated-transmission indication information, and a quantity of TCI states is greater than or equal to a fourth preset value. In this case, the terminal device may determine that a transmission mode is a TDM mode. Further, the terminal device may distinguish between a first TDM mode and a second TDM mode.

During implementation of Embodiment 5 provided in this application, after obtaining the TCI information and the repeated-transmission indication information, the terminal device determines the transmission mode without additional indication information.

In Embodiment 6, configuration indication information is repeated-transmission indication information and DMRS indication information, and the repeated-transmission indication information is used to indicate a frequency domain repeated-transmission parameter, a first time domain repeated-transmission parameter, and a second time domain repeated-transmission parameter.

The repeated-transmission indication information may be represented by $\{a, b, c\}$. For example, a represents the frequency domain repeated-transmission parameter, that is, a quantity of transmission repetitions in frequency domain; b represents the first time domain repeated-transmission parameter, that is, a quantity of transmission repetitions within a slot in time domain; and c represents the second time domain repeated-transmission parameter, that is, a quantity of transmission repetitions between slots in time domain.

In an embodiment, after a terminal device determines that a current transmission scenario is a multi-station transmission scenario, the terminal device may determine a quantity of CDM groups based on the DMRS indication information, and may distinguish between an SDM mode and another transmission mode based on the quantity of CDM groups.

Example 1

If the quantity of CDM groups is 2, and the repeated-transmission indication information is $\{1, 1, 1\}$, the terminal device may determine that the transmission mode is the SDM mode; or if the quantity of CDM groups is 2, and the terminal device has not obtained the repeated-transmission indication information, the terminal device may determine that the transmission mode is the SDM mode. Example 2: If the quantity of CDM groups is 1, and the repeated-transmission indication information is $\{1, 1, 1\}$, the terminal device may determine that the transmission mode is a first FDM mode; or if the quantity of CDM groups is 1, and the terminal device has not obtained the repeated-transmission indication information, the terminal device may determine that the transmission mode is a first FDM mode. Example 3: If the quantity of CDM groups is 1, and the repeated-transmission indication information is a value other than $\{1, 1, 1\}$, the terminal device may determine that the transmission mode is a second FDM mode or a TDM mode.

In an embodiment, after a terminal device determines that a current transmission scenario is a multi-station transmission scenario, the terminal device may determine a quantity of CDM groups based on the DMRS indication information, and may determine a transmission mode based on the quantity of CDM groups, the frequency domain repeated-transmission parameter, the first time domain repeated-transmission parameter, and the second time domain repeated-transmission parameter.

For example, if the quantity of CDM groups is 2, and the repeated-transmission indication information is $\{1, x, 1\}$ or $\{1, 1, x\}$, the terminal device may determine that the transmission mode is an integrated mode of a TDM mode and the SDM mode. When the repeated-transmission indication information is $\{1, x, 1\}$, the transmission mode is the integrated mode of a first TDM mode and the SDM mode; and when the repeated-transmission indication information is $\{1, 1, x\}$, the transmission mode is an integrated mode of a second TDM mode and the SDM mode.

For example, if the quantity of CDM groups is 1, and the repeated-transmission indication information is $\{x, y, 1\}$ or $\{x, 1, z\}$, the terminal device may determine that the transmission mode is an integrated mode of the TDM mode and an FDM mode, where x, y, z are integers greater than 1, x represents a quantity of transmission repetitions in frequency domain, y represents a quantity of transmission repetitions within a slot, and z represents a quantity of transmission repetitions between slots. When the repeated-transmission indication information is $\{x, y, 1\}$, the transmission mode is an integrated mode of the first TDM mode and the second FDM mode; when the repeated-transmission indication information is $\{x, 1, z\}$, the transmission mode is an integrated mode of the second TDM mode and the second FDM mode; and when the repeated-transmission indication information is {1, y, z}, the transmission mode is an integrated mode of the first TDM mode and the second TDM mode.

During implementation of Embodiment 6 provided in this application, after obtaining the DMRS indication information and the repeated-transmission indication information, the terminal device determines the transmission mode without additional indication information.

In the embodiment shown in FIG. 11, when determining that the current transmission scenario is a multi-station transmission scenario, the terminal device determines the transmission mode based on the obtained configuration indication information without additional indication information, so that indication signaling overheads can be reduced.

Figure 12:
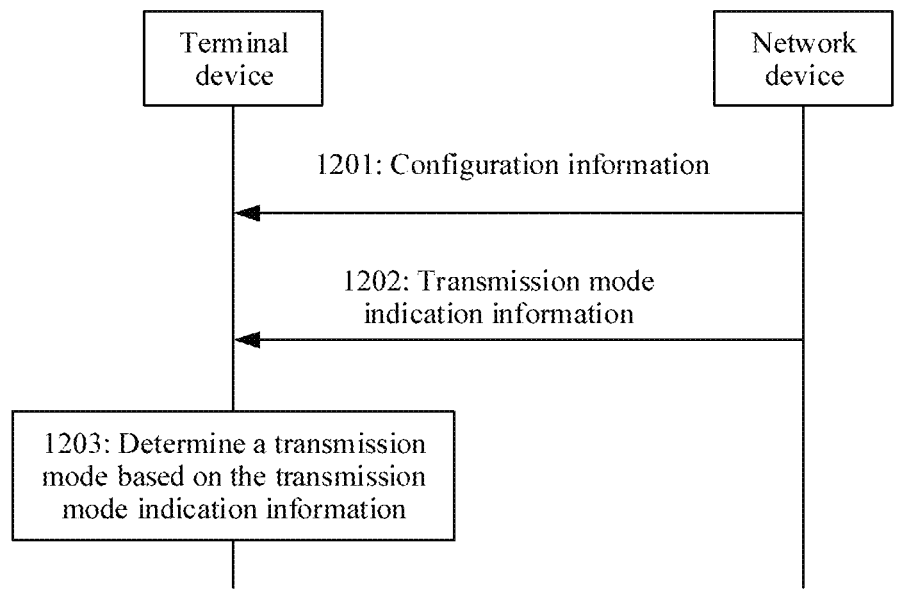
FIG. 12 is a flowchart of another method for determining a transmission mode according to an embodiment of this application.

FIG. 12 is a flowchart of another method for determining a transmission mode according to an embodiment of this application. The procedure may include but is not limited to the following operations.

Step 1201: A network device transmits configuration information to a terminal device. Correspondingly, the terminal device receives the configuration information from the network device.

The configuration information may be understood as configuration information indicating a uRLLC scenario, to distinguish between the multi-station uRLLC scenario and a multi-station eMBB scenario.

In a first embodiment, the configuration information may be used to indicate that the terminal device can use a bit rate lower than a preset bit rate, or used to indicate that the terminal device uses a preset modulation and coding scheme (MCS) table. The preset bit rate may be 120*1024 (Kbps), the preset MCS table may be a modulation and coding scheme table 3, and a bit rate lower than 120*1024 (Kbps) exists in the MCS table 3. The bit rate is a target bit rate (target bit rate).

The MCS table 3 may be shown in the following Table 4, that is, the following Table 4 is the MCS table 3.

TABLE 4

| MCS index | Modulation order | Target bit rate*[1024] |
| --- | --- | --- |
| 0 | 2 | 30 |
| 1 | 2 | 40 |
| 2 | 2 | 50 |
| 3 | 2 | 64 |
| 4 | 2 | 78 |
| 5 | 2 | 99 |
| 6 | 2 | 120 |
| 7 | 2 | 157 |
| 8 | 2 | 193 |
| 9 | 2 | 251 |
| 10 | 2 | 308 |
| 11 | 2 | 379 |
| 12 | 2 | 449 |
| 13 | 2 | 526 |
| 14 | 2 | 602 |
| 15 | 4 | 340 |
| 16 | 4 | 378 |
| 17 | 4 | 434 |
| 18 | 4 | 490 |
| 19 | 4 | 553 |
| 20 | 4 | 616 |
| 21 | 6 | 438 |
| 22 | 6 | 466 |
| 23 | 6 | 517 |
| 24 | 6 | 567 |
| 25 | 6 | 616 |
| 26 | 6 | 666 |
| 27 | 6 | 719 |

TABLE 4-continued

| MCS index | Modulation order | Target bit rate*[1024] |
| --- | --- | --- |
| 28 | 6 | 772 |
| 29 | 2 | Reserved |
| 30 | 4 | |
| 31 | 6 | |

In Table 4, there are six bit rates lower than 120*1024 (Kbps). The network device indicates the terminal device to use the MCS table 3, to indicate that a current transmission scenario is a uRLLC scenario.

In a first embodiment, the configuration information may be a newly defined radio network temporary identity (RNTI) or a field in newly defined DCI. If the terminal device has detected the configuration information, the terminal device may consider that a current transmission scenario is a multi-station uRLLC scenario; or if the terminal device has not detected the configuration information, the terminal device may consider that a current transmission scenario is a multi-station eMBB scenario.

In a second embodiment, configuration information related to an existing multi-station uRLLC scenario, for example, a modulation and coding scheme cell radio network temporary identity (MCS-C-TNTI), may be reused as the configuration information. If the terminal device has detected the MCS-C-RNTI, the terminal device may consider that a current transmission scenario is a multi-station uRLLC scenario. If the terminal device has not obtained the MCS-C-RNTI, the terminal device may consider that a current transmission scenario is an eMBB scenario.

In a third embodiment, the configuration information may be used to directly indicate that a current transmission scenario is a multi-station uRLLC scenario. If the terminal device has detected the configuration information, the terminal device may consider that the current transmission scenario is a multi-station uRLLC scenario; or if the terminal device has not detected the configuration information, the terminal device may consider that the current transmission scenario is a multi-station eMBB scenario. In this manner, the configuration information may be a newly defined RNTI or a field in newly defined DCI.

In another embodiment, the configuration information may be understood as configuration information indicating an eMBB scenario, for example, indicating an exclusive feature of a multi-station eMBB scenario, or indicating that configuration information related to an existing multi-station eMBB scenario is reused, or indicating that the configuration information may be directly used to indicate that a current transmission scenario is a multi-station eMBB scenario.

Step 1202: The network device sends transmission mode indication information to the terminal device. Correspondingly, the terminal device receives the transmission mode indication information from the network device.

The transmission mode indication information may be carried in DCI or RRC signaling. The transmission mode is one or more of an SDM transmission mode, a first FDM transmission mode, a second FDM transmission mode, a first TDM transmission mode, or a second TDM transmission mode.

For example, the transmission mode indication information may be "SchemeSelection" in the RRC signaling, and is used to indicate the transmission mode. The transmission mode indication information may include five parameters {1, 2, 3, 4, 5}, which respectively correspond to the SDM transmission mode, the first FDM transmission mode, the second FDM transmission mode, the first TDM transmission mode, or the second TDM transmission mode. The transmission mode can be indicated by indicating one of the five parameters. The transmission mode indication information may alternatively indicate the transmission mode by using three bits. An indication manner is not limited in this embodiment of this application.

It should be noted that an execution sequence of operation 1201 and operation 1202 is not limited in this embodiment of this application. For example, operation 1202 is performed before operation 1201, such as where the terminal device has obtained the transmission mode indication information from the received RRC signaling before obtaining the configuration information. It may be understood that there is a binding relationship between the configuration information and the transmission mode indication information.

Step 1203: The terminal device determines the transmission mode based on the transmission mode indication information.

After obtaining the transmission mode indication information, the terminal device directly determines, based on the transmission mode indicated by the transmission mode indication information, a transmission mode used by the network device. The implementation is simple.

In an embodiment, after the terminal device determines that the current transmission scenario is the multi-station uRLLC scenario, if the terminal device successfully descrambles a physical downlink control channel (PDCCH) by using an RNTI, the terminal device may determine a transmission mode in the multi-station uRLLC scenario based on the RNTI. The terminal device and the network device store correspondences between various RNTIs and transmission modes in the multi-station uRLLC scenario. The terminal device can directly determine the current transmission mode of the network device based on the RNTI used to successfully descramble the PDCCH.

In the embodiment shown in FIG. 12, the terminal device may implement dynamic switching between the multi-station uRLLC scenario and the multi-station eMBB scenario based on the configuration information, and no additional indication overheads are required. After determining that the current transmission scenario is the multi-station uRLLC scenario, the terminal device determines a transmission mode in the multi-station uRLLC scenario based on the transmission mode indication information. The implementation is simple.

Corresponding to the method provided in the foregoing method embodiments, an embodiment of this application further provides a corresponding communications apparatus. The communications apparatus includes a corresponding module configured to perform the foregoing embodiment. The module may be software, hardware, or a combination of software and hardware.

The communications apparatus may be a terminal device, an apparatus in a terminal device, or an apparatus that can be used together with a terminal device. In a design, the communications apparatus may include a transceiver unit and a processing unit.

In an embodiment, the transceiver unit is configured to obtain configuration indication information, where the configuration indication information is one or more of DMRS indication information, repeated-transmission indication information, or transmission configuration indication information; and the processing unit is configured to determine a transmission mode based on the configuration indication information, where the transmission mode is one or more of a space division multiplexing mode, a frequency division multiplexing mode, or a time division multiplexing mode.

Optionally, the processing unit determines that the configuration indication information is the repeated-transmission indication information, and the repeated-transmission indication information is used to indicate a time domain repeated-transmission parameter.

Optionally, the processing unit is configured to determine, based on the time domain repeated-transmission parameter, that the transmission mode is the time division multiplexing mode.

Optionally, the processing unit is configured to: if the time domain repeated-transmission parameter is a first time domain repeated-transmission parameter, determine that the time division multiplexing mode is a first time division multiplexing mode; or if the time domain repeated-transmission parameter is a second time domain repeated-transmission parameter, determine that the time division multiplexing mode is a second time division multiplexing mode; or if the time domain repeated-transmission parameter includes offset information, determine that the time division multiplexing mode is a first time division multiplexing mode; or if the time domain repeated-transmission parameter does not include offset information, determine that the time division multiplexing mode is a second time division multiplexing mode, where the first time division multiplexing mode is a time division multiplexing mode within a slot unit, and the second time division multiplexing mode is a time division multiplexing mode between slot units.

Optionally, the processing unit determines that the configuration indication information is the repeated-transmission indication information, and the repeated-transmission indication information is used to indicate a first time domain repeated-transmission parameter and a second time domain repeated-transmission parameter; and the processing unit is configured to: if both the first time domain repeated-transmission parameter and the second time domain repeated-transmission parameter are a first preset value, determine that the transmission mode is the space division multiplexing mode, the frequency division multiplexing mode, or an integrated mode of the space division multiplexing mode and the frequency division multiplexing mode; or if one or both of the first time domain repeated-transmission parameter and the second time domain repeated-transmission parameter are greater than a first preset value, determine that the transmission mode is the time division multiplexing mode.

Optionally, the processing unit is configured to:

if the first time domain repeated-transmission parameter is the first preset value and the second time domain repeated-transmission parameter is greater than the first preset value, determine that the time division multiplexing mode is a second time division multiplexing mode;

if the second time domain repeated-transmission parameter is the first preset value and the first time domain repeated-transmission parameter is greater than the first preset value, determine that the time division multiplexing mode is a first time division multiplexing mode; or if both the first time domain repeated-transmission parameter and the second time domain repeated-transmission parameter are greater than the first preset value, determine that the time division multiplexing mode is an integrated mode of a first time division multiplexing mode and a second time division multiplexing mode, where the first time division multiplexing mode is a time division multiplexing mode within a slot unit, and the second time division multiplexing mode is a time division multiplexing mode between slot units.

Optionally, if the transceiver unit has not obtained the configuration indication information, the processing unit is further configured to determine that the transmission mode is the space division multiplexing mode, the frequency division multiplexing mode, or the integrated mode of the space division multiplexing mode and the frequency division multiplexing mode.

Optionally, the processing unit determines that the configuration indication information is the DMRS indication information; and the processing unit is configured to: determine one or more DMRS port identifiers based on the DMRS indication information, and determine the transmission mode based on the one or more DMRS port identifiers.

Optionally, the processing unit is configured to:

if a quantity of CDM groups corresponding to the one or more DMRS port identifiers is a second preset value, determine that the transmission mode is the frequency division multiplexing mode; or if a quantity of CDM groups corresponding to the one or more DMRS port identifiers is a third preset value, determine that the transmission mode is the space division multiplexing mode; or if the one or more DMRS port identifiers belong to a same CDM group, determine that the transmission mode is the frequency division multiplexing mode; or if the one or more DMRS port identifiers do not belong to a same CDM group, determine that the transmission mode is the space division multiplexing mode; or if a quantity of the one or more DMRS port identifiers is a second preset value, determine that the transmission mode is the frequency division multiplexing mode; or if a quantity of the one or more DMRS port identifiers is not a second preset value, determine that the transmission mode is the space division multiplexing mode; or if the one or more DMRS port identifiers are preset identifiers, determine that the transmission mode is the frequency division multiplexing mode; or if the one or more DMRS port identifiers are not preset identifiers, determine that the transmission mode is the space division multiplexing mode.

Optionally, the processing unit determines that the configuration indication information is the DMRS indication information; and the processing unit is configured to: determine a quantity of CDM groups based on the DMRS indication information, and determine the transmission mode based on the quantity of CDM groups.

Optionally, the processing unit is configured to: if the quantity of CDM groups is a second preset value, determine that the transmission mode is the frequency division multiplexing mode; or if the quantity of CDM groups is a third preset value, determine that the transmission mode is the space division multiplexing mode.

Optionally, the processing unit is configured to: if a frequency domain repeated-transmission parameter has been obtained, determine that the frequency division multiplexing mode is a second frequency division multiplexing mode; or if a frequency domain repeated-transmission parameter has not been obtained, determine that the frequency division multiplexing mode is a first frequency division multiplexing mode, where the first frequency division multiplexing mode is a single-codeword-based frequency division multiplexing mode, and the second frequency division multiplexing mode is a multi-codeword-based frequency division multiplexing mode.

Optionally, the processing unit is configured to: determine, based on the time domain repeated-transmission parameter, that the transmission mode is a second time division multiplexing mode, where the second time division multiplexing mode is a time division multiplexing mode between slot units.

Optionally, the processing unit determines that the configuration indication information is the DMRS indication information; and the processing unit is configured to: determine DMRS port information based on the DMRS indication information, and determine the transmission mode based on the DMRS port information.

Optionally, the processing unit determines that the DMRS port information includes one or more DMRS port identifiers and a quantity of CDM groups without data; and the processing unit is configured to:

determine, based on a quantity of CDM groups corresponding to the one or more DMRS port identifiers and the quantity of CDM groups without data, that the transmission mode is the space division multiplexing mode, the frequency division multiplexing mode, or a first time division multiplexing mode, where the first time division multiplexing mode is a time division multiplexing mode within a slot unit; and if the transmission mode is the frequency division multiplexing mode, determine, based on a group identifier of a CDM group corresponding to the one or more DMRS port identifiers, that the transmission mode is a first frequency division multiplexing mode or a second frequency division multiplexing mode, where the first frequency division multiplexing mode is a single-codeword-based frequency division multiplexing mode, and the second frequency division multiplexing mode is a multi-codeword-based frequency division multiplexing mode.

Optionally, the processing unit determines that the configuration indication information is the DMRS indication information and the repeated-transmission indication information, and the repeated-transmission indication information is used to indicate a frequency domain repeated-transmission parameter, a first time domain repeated-transmission parameter, and a second time domain repeated-transmission parameter; and the processing unit is configured to: determine a quantity of CDM groups based on the DMRS indication information, and determine the transmission mode based on the quantity of CDM groups, the frequency domain repeated-transmission parameter, the first time domain repeated-transmission parameter, and the second time domain repeated-transmission parameter.

Optionally, the processing unit determines that the configuration indication information is the transmission configuration indication information, and the transmission configuration indication information is used to indicate a transmission configuration indication state; and the processing unit is configured to:

if a quantity of transmission configuration indication states is a fourth preset value, determine that the transmission mode is the frequency division multiplexing mode or the space division multiplexing mode; or if a quantity of transmission configuration indication states is greater than a fourth preset value, determine that the transmission mode is the time division multiplexing mode.

Optionally, the processing unit determines that the configuration indication information is the transmission configuration indication information and the repeated-transmission indication information, the transmission configuration indication information is used to indicate a transmission configuration indication state, and the repeated-transmission indication information is used to indicate a time domain repeated-transmission parameter; and the processing unit is configured to: determine, based on a quantity of transmission configuration indication states and the time domain repeated-transmission parameter, that the transmission mode is the time division multiplexing mode.

In an embodiment, the processing unit is configured to: if the transceiver unit has obtained configuration information, obtain transmission mode indication information, where the transmission mode indication information is used to indicate a transmission mode; and determine the transmission mode based on the transmission mode indication information.

Optionally, the transmission mode is one or more of a space division multiplexing mode, a first frequency division multiplexing mode, a second frequency division multiplexing mode, a first time division multiplexing mode, or a second time division multiplexing mode, where the first frequency division multiplexing mode is a single-codeword-based frequency division multiplexing mode, the second frequency division multiplexing mode is a multi-codeword-based frequency division multiplexing mode, the first time division multiplexing mode is a time division multiplexing mode within a slot unit, and the second time division multiplexing mode is a time division multiplexing mode between slot units.

Optionally, the configuration information is used to indicate that a terminal device can use a bit rate lower than a preset bit rate or is used to indicate that a terminal device uses a preset modulation and coding scheme table.

Figure 13:
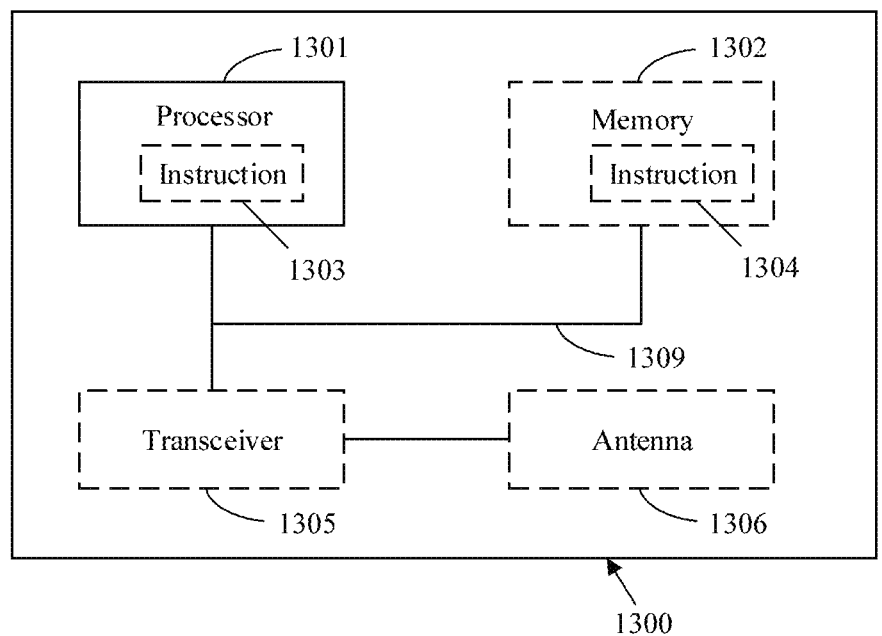
FIG. 13 is a diagram of a communications apparatus according to an embodiment of this application.

FIG. 13 is a diagram of a communications apparatus 1300. The communications apparatus 1300 may be a network device, may be a terminal device, may be a chip, a chip system, a processor, or the like that supports a network device in implementing the foregoing method, or may be a chip, a chip system, a processor, or the like that supports a terminal device in implementing the foregoing method. The apparatus may be configured to implement the method described in the foregoing method embodiments. For details, refer to the descriptions in the foregoing method embodiments.

The communications apparatus 1300 may include one or more processors 1301. The processor 1301 may be a general-purpose processor, a special-purpose processor, or the like. For example, the processor 1301 may be a baseband processor or a central processing unit. The baseband processor may be configured to process a communications protocol and communications data. The central processing unit may be configured to: control the communications apparatus (for example, a base station, a baseband chip, a terminal, a terminal a chip, a DU, or a CU), execute a software program, and process data of the software program.

Optionally, the communications apparatus 1300 may include one or more memories 1302. The memory 1302 may store an instruction 1304, and the instruction may be run on the processor 1301, so that the apparatus 1300 performs the method described in the foregoing method embodiments. Optionally, the memory 1302 may further store data. The processor 1301 and the memory 1302 may be disposed separately, or may be integrated together.

Optionally, the communications apparatus 1300 may further include a transceiver 1305 and an antenna 1306. The transceiver 1305 may be referred to as a transceiver unit, a transceiver machine, a transceiver circuit, a transceiver, or the like, and is configured to implement receiving and sending functions.

The communications apparatus 1300 is a terminal device. The processor 1301 is configured to perform operation 1102 in FIG. 11 and operation 1203 in FIG. 12. The transceiver 1305 is configured to perform operation 1101 in FIG. 11, and operation 1201 and operation 1202 in FIG. 12. Alternatively, the transceiver 1305 and the antenna 1306 are configured to perform operation 1101 in FIG. 11, and operation 1201 and operation 1202 in FIG. 12.

If the communications apparatus 1300 is a network device, the transceiver 1305 is configured to perform operation 1101 in FIG. 11, and operation 1201 and operation 1202 in FIG. 12. Alternatively, the transceiver 1305 and the antenna 1306 are configured to perform operation 1101 in FIG. 11, and operation 1201 and operation 1202 in FIG. 12. In an optional design, the processor 1301 may alternatively store an instruction 1303. The instruction 1303 may be executed by the processor, so that the communications apparatus 1300 performs the method described in the foregoing method embodiments.

In another optional design, the processor 1301 may include a transceiver 1305 configured to implement receiving and sending functions. For example, the transceiver 1305 may be a transceiver circuit, an interface, or an interface circuit. A transceiver circuit, an interface, or an interface circuit configured to implement the receiving and sending functions may be separated, or may be integrated together. The transceiver circuit, the interface, or the interface circuit may be configured to read and write code/data; or the transceiver circuit, the interface, or the interface circuit may be configured to transmit or transfer a signal.

In an embodiment, the communications apparatus 1300 may include a circuit, and the circuit may implement the sending function, the receiving function, or the communication function in the foregoing method embodiments.

The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor 1301 and the transceiver 1305 may alternatively be manufactured by using various IC technologies, for example, a complementary metal oxide semiconductor (CMOS), an n-type metal oxide semiconductor (NMOS), a p-type metal oxide semiconductor (PMOS), a bipolar junction transistor (BJT), a bipolar CMOS (BiCMOS), silicon germanium (SiGe), and gallium arsenide (GaAs).

The communications apparatus 1300 in the foregoing embodiment may be a network device or a terminal device. However, a scope of the communications apparatus 1300 described in this application is not limited thereto, and a structure of the communications apparatus 1300 may not be limited by FIG. 13. The communications apparatus 1300 may be an independent device or may be a part of a relatively large device. For example, the communications apparatus 1300 may be:

(1) an independent integrated circuit IC, a chip, a chip system, or a subsystem;

(2) a set including one or more ICs, where optionally, the IC set may further include a storage component configured to store data and an instruction;

(3) an ASIC, for example, a modem (MSM);

(4) a module that can be embedded in another device;

(5) a receiver, a terminal, an intelligent terminal, a cellular phone, a wireless device, a handheld phone, a mobile unit, a vehicle-mounted device, a network device, a cloud device, an artificial intelligence device, or the like; and (6) other devices.

Figure 14:
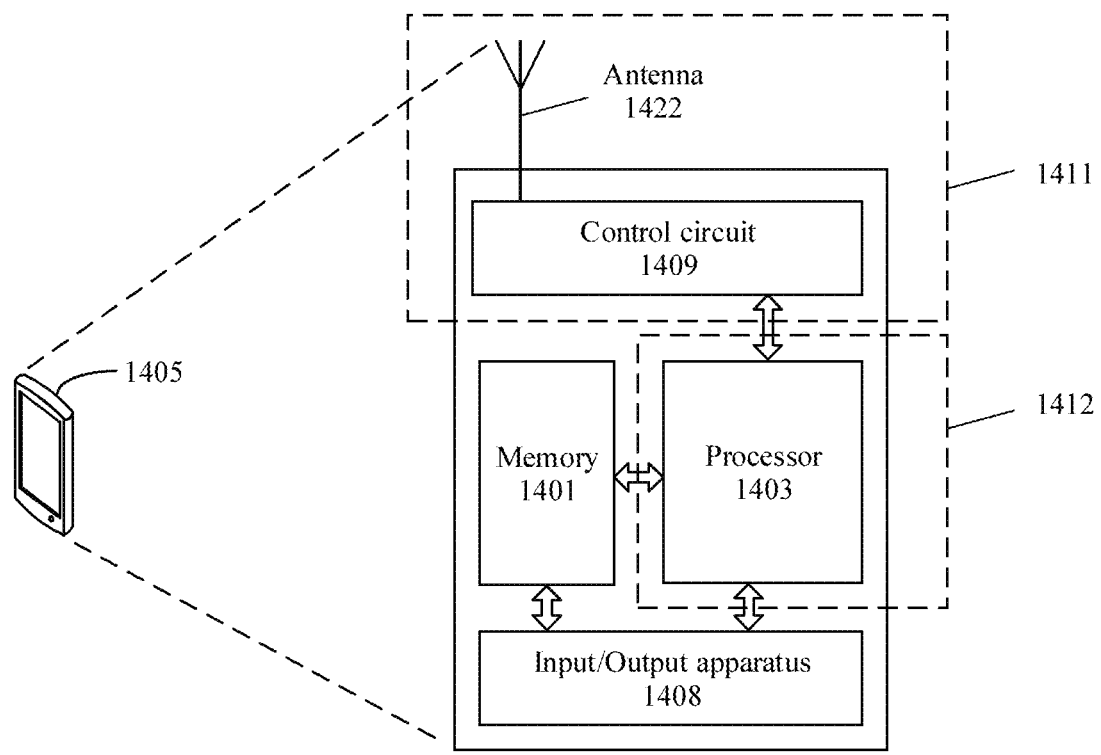
FIG. 14 is a diagram of a terminal device according to an embodiment of this application.

FIG. 14 is a diagram of a terminal device 1400. For ease of description, FIG. 14 shows only main components of the terminal device 1400. As shown in FIG. 14, the terminal device 1400 includes a processor 1403, a memory 1401, a control circuit 1409, an antenna 1422, and an input/output apparatus 1408. The processor 1403 is mainly configured to: process a communications protocol and communications data, control the entire terminal, execute a software program, and process data of the software program. The memory 1401 is mainly configured to store the software program and data. The radio frequency circuit is mainly configured to: perform conversion between a baseband signal and a radio frequency signal, and process the radio frequency signal. The antenna 1422 is mainly configured to receive and send a radio frequency signal in a form of an electromagnetic wave. The input/output apparatus 1408 includes input and/or output devices such as a touchscreen, a display, or a keyboard, and the Input/Output apparatus 1408 is mainly configured to receive data entered by a user and output data to the user.

After the terminal device 1400 is powered on, the processor 1403 may read a software program in a storage unit, parse and execute an instruction of the software program, and process data of the software program. When data needs to be sent wirelessly, after performing baseband processing on the to-be-sent data, the processor 1403 outputs a baseband signal to a radio frequency circuit. After processing the baseband signal, the radio frequency circuit obtains a radio frequency signal and sends the radio frequency signal to the outside through an antenna 1422 in a form of an electromagnetic wave. When data is sent to the terminal device 1400, the radio frequency circuit receives a radio frequency signal through the antenna 1422, further converts the radio frequency signal into a baseband signal, and outputs the baseband signal to the processor 1403; and the processor 1403 converts the baseband signal into data, and processes the data.

For ease of description, FIG. 14 shows only one memory and one processor 1403. In an actual terminal device 1400, there may be a plurality of processors and a plurality of memories. The memory may also be referred to as a storage medium, a storage device, or the like. This is not limited in this embodiment of the present disclosure.

In an optional implementation, the processor 1403 may include a baseband processor 1411 and a central processing unit 1412. The baseband processor 1411 is mainly configured to process a communications protocol and communications data. The central processing unit 1412 is mainly configured to: control the entire terminal device 1400, execute a software program, and process data of the software program. Functions of the baseband processor 1411 and the central processing unit 1412 are integrated into the processor 1403 in FIG. 14. A person skilled in the art may understand that the baseband processor 1411 and the central processing unit 1412 each may be an independent processor, and are interconnected by using technologies such as a bus. A person skilled in the art may understand that the terminal device 1400 may include a plurality of baseband processors 1411 to adapt to different network standards, the terminal device 1400 may include a plurality of central processing units 1412 to improve a processing capability of the terminal device 1400, and the components of the terminal device 1400 may be connected by using various buses. The baseband processor 1411 may also be expressed as a baseband processing circuit or a baseband processing chip. The central processing unit 1412 may also be expressed as a central processing circuit or a central processing chip. A function of processing the communications protocol and the communications data may be built in the processor, or may be stored in the storage unit in a form of software program. The processor executes the software program to implement a baseband processing function.

A person skilled in the art may further understand that various illustrative logical blocks and operations that are listed in the embodiments of this application may be implemented by using electronic hardware, computer software, or a combination thereof. Whether such a function is implemented by using hardware or software depends on particular applications and a design requirement of the entire system. A person skilled in the art may use various methods to implement the described functions for each particular application, but it should not be considered that such an implementation goes beyond the scope of the embodiments of this application.

This application further provides a computer-readable medium. The computer-readable medium stores a computer program. When the computer program is executed by a computer, a function in any one of the foregoing method embodiments is implemented.

This application further provides a computer program product. When the computer program product is executed by a computer, a function in any one of the foregoing method embodiments is implemented.

All or some of the foregoing embodiments may be implemented by software, hardware, firmware, or any combination thereof. When software is used to implement the embodiments, all or some of the embodiments may be implemented in a form of computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

A person of ordinary skill in the art may understand that various reference numerals such as "first" and "second" in this application are merely used for differentiation for ease of description, and are not used to limit the scope of the embodiments of this application, or represent a sequence.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may also be other names that can be understood by a communications apparatus, and values or representation manners of the parameters may also be other values or representation manners that can be understood by the communications apparatus. During implementation of the foregoing tables, another data structure, such as an array, a queue, a container, a stack, a linear table, a pointer, a linked list, a tree, a graph, a structure, a class, a pile, or a hash table, may be used.

"Predefine" mentioned this application may be understood as "define", "predefine", "store", "pre-store", "pre-negotiate", "pre-configure", "solidify", or "pre-burn".

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a transmission mode, comprising:
    obtaining configuration indication information, the configuration indication information comprising demodulation reference signal (DMRS) indication information, or a combination of repeated-transmission indication information and transmission configuration indication information, wherein the DMRS indication information indicates one or more DMRS port identifiers; and
    determining a transmission mode based on the configuration indication information;
    when the configuration indication information comprises the DMRS indication information, the determining the transmission mode based on the configuration indication information comprises determining the transmission mode as a frequency division multiplexing (FDM) mode or a space division multiplexing (SDM) mode based on the one or more DMRS port identifiers;
    when the configuration indication information comprises the combination of repeated-transmission indication information and transmission configuration indication information, the determining the transmission mode based on the configuration indication information comprises determining the transmission mode as a time division multiplexing (TDM) mode.

2. The method according to claim 1, wherein when the configuration indication information comprises the DMRS indication information, the determining the transmission mode based on the configuration indication information comprises:
    determining a quantity of code division multiplexing (CDM) groups based on the one or more DMRS port identifiers; and
    determining the transmission mode based on the quantity of CDM groups.

3. The method according to claim 2, wherein the determining the transmission mode based on the quantity of CDM groups comprises:
    determining that the transmission mode is the FDM mode when the quantity of CDM groups is 1, or determining that the transmission mode is the SDM mode when the quantity of CDM groups is 2.

4. The method according to claim 1, wherein when the configuration indication information comprises the combination of the transmission configuration indication information and the repeated-transmission indication information, and when a quantity of transmission configuration indication states corresponding to the transmission configuration indication information is greater than or equal to 2, the determining the transmission mode based on the configuration indication information comprises:
    determining the transmission mode is the TDM mode.

5. A communications apparatus, comprising:
    at least one processor configured with processor-executable instructions to perform operations comprising:
    obtaining configuration indication information, the configuration indication information comprising demodulation reference signal (DMRS) indication information, or a combination of repeated-transmission indication information and transmission configuration indication information, wherein the DMRS indication information indicates one or more DMRS port identifiers; and
    determining a transmission mode based on the configuration indication information;
    when the configuration indication information comprises the DMRS indication information, the determining the transmission mode based on the configuration indication information comprises determining the transmission mode as a frequency division multiplexing (FDM) mode or a space division multiplexing (SDM) mode based on the one or more DMRS port identifiers;
    when the configuration indication information comprises the combination of repeated-transmission indication information and transmission configuration indication information, the determining the transmission mode based on the configuration indication information comprises determining the transmission mode as a time division multiplexing (TDM) mode.

6. The communications apparatus according to claim 5, wherein when the configuration indication information comprises the DMRS indication information, the processor-executable instructions further cause the at least one processor to:
    determine a quantity of code division multiplexing (CDM) groups based on the one or more DMRS port identifiers; and
    determine the transmission mode based on the quantity of CDM groups.

7. The communications apparatus according to claim 6, wherein the processor-executable instructions further cause the at least one processor to:
  determine that the transmission mode is the FDM mode when the quantity of CDM groups is 1; or determine that the transmission mode is the SDM mode when the quantity of CDM groups is 2.

8. The apparatus according to claim 5, wherein when the configuration indication information comprises the combination of the transmission configuration indication information and the repeated-transmission indication information, and when a quantity of transmission configuration indication states corresponding to the transmission configuration indication information is greater than or equal to 2, the processor-executable instructions further cause the at least one processor to:
  determine the transmission mode is the TDM mode.

9. A non-transitory computer-readable medium storing computer instructions that when executed by one or more processors, cause the one or more processors to perform at least operations of:
  obtaining configuration indication information, the configuration indication information comprising demodulation reference signal (DMRS) indication information, or a combination of repeated-transmission indication information and transmission configuration indication information, wherein the DMRS indication information indicates one or more DMRS port identifiers; and
  determining a transmission mode based on the configuration indication information;
  when the configuration indication information comprises the DMRS indication information, the determining the transmission mode based on the configuration indication information comprises determining the transmission mode as a frequency division multiplexing (FDM) mode or a space division multiplexing (SDM) mode based on the one or more DMRS port identifiers;
  when the configuration indication information comprises the combination of repeated-transmission indication information and transmission configuration indication information, the determining the transmission mode based on the configuration indication information comprises determining the transmission mode as a time division multiplexing (TDM) mode.

10. The non-transitory computer-readable medium according to claim 9, wherein the configuration indication information comprises the DMRS indication information, and the determining the transmission mode based on the configuration indication information comprises:
  determining a quantity of code division multiplexing (CDM) groups based on the one or more DMRS port identifiers; and
  determining the transmission mode based on the quantity of CDM groups.

11. The non-transitory computer-readable medium according to claim 9, wherein the determining the transmission mode based on the quantity of CDM groups comprises:
  determining that the transmission mode is the FDM mode when the quantity of CDM groups is 1, or determining that the transmission mode is the SDM mode when the quantity of CDM groups is 2.

12. The non-transitory computer-readable medium according to claim 9, wherein the configuration indication information comprises the combination of the transmission configuration indication information and the repeated-transmission indication information, and when a quantity of transmission configuration indication states corresponding to the transmission configuration indication information is greater than or equal to 2, the determining the transmission mode based on the configuration indication information comprises:
  determining the transmission mode is the TDM mode.

13. A communications chip comprising:
  at least one processor, the at least one processor being coupled with at least one memory that stores computer instructions, that when executed by the at least one processor, cause the at least one processor to perform operations comprising:
  obtaining configuration indication information, the configuration indication information comprising demodulation reference signal (DMRS) indication information, or a combination of repeated-transmission indication information and transmission configuration indication information, wherein the DMRS indication information indicates one or more DMRS port identifiers; and
  determining a transmission mode based on the configuration indication information;
  when the configuration indication information comprises the DMRS indication information, the determining the transmission mode based on the configuration indication information comprises determining the transmission mode as a frequency division multiplexing (FDM) mode or a space division multiplexing (SDM) mode based on the one or more DMRS port identifiers;
  when the configuration indication information comprises the combination of repeated-transmission indication information and transmission configuration indication information, the determining the transmission mode based on the configuration indication information comprises determining the transmission mode as a time division multiplexing (TDM) mode.

14. The communications chip according to claim 13, wherein the configuration indication information comprises the DMRS indication information, and the determining the transmission mode based on the configuration indication information comprises:
  determining a quantity of code division multiplexing (CDM) groups based on the one or more DMRS port identifiers; and
  determining the transmission mode based on the quantity of CDM groups.

15. The communications chip according to claim 13, wherein the determining the transmission mode based on the quantity of CDM groups comprises:
  determining that the transmission mode is the FDM mode when the quantity of CDM groups is 1, or determining that the transmission mode is the SDM mode when the quantity of CDM groups is 2.

16. The communications chip according to claim 13, wherein the configuration indication information comprises the combination of the transmission configuration indication information and the repeated-transmission indication information, and when a quantity of transmission configuration indication states corresponding to the transmission configuration indication information is greater than or equal to 2, the determining the transmission mode based on the configuration indication information comprises:
  determining the transmission mode is the TDM mode.

* * * * *